(12) United States Patent
Takeda et al.

(10) Patent No.: US 8,995,056 B2
(45) Date of Patent: Mar. 31, 2015

(54) LAMINATED OPTICAL FILM, AND POLARIZING PLATE AND LIQUID CRYSTAL DISPLAY INCLUDING THE SAME

(71) Applicant: FUJIFILM Corporation, Tokyo (JP)

(72) Inventors: Jun Takeda, Kanagawa (JP); Masato Nakao, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 218 days.

(21) Appl. No.: 13/629,362

(22) Filed: Sep. 27, 2012

(65) Prior Publication Data

US 2013/0083394 A1 Apr. 4, 2013

(30) Foreign Application Priority Data

Sep. 30, 2011 (JP) ................................ 2011-216236
Sep. 19, 2012 (JP) ................................ 2012-205360

(51) Int. Cl.
*G02B 5/30* (2006.01)
*G02F 1/1335* (2006.01)
(Continued)

(52) U.S. Cl.
CPC . *B32B 7/02* (2013.01); *B32B 23/04* (2013.01); *B32B 27/06* (2013.01); *G02F 1/13363* (2013.01); *G02B 5/30* (2013.01); *G02B 5/3016* (2013.01); *G02B 27/286* (2013.01); *G02F 2202/40* (2013.01); *G02F 2413/02* (2013.01)
USPC ..................................... 359/489.07; 349/118

(58) Field of Classification Search
CPC .... G02B 5/3083; G02B 5/32; G02F 1/13363; G02F 1/133634
USPC ....................................... 359/489.07; 349/118
See application file for complete search history.

(56) References Cited

U.S. PATENT DOCUMENTS 7,283,189 B2 10/2007 Jeon et al.
7,625,612 B2 * 12/2009 Ohmori et al. .................. 428/1.3

(Continued)

FOREIGN PATENT DOCUMENTS

JP  2002-331616 A  11/2002
JP  2002-333524 A  11/2002
(Continued)

OTHER PUBLICATIONS

Official Action issued by the Japanese Patent Office on Sep. 30, 2014, in connection with Japanese Patent Application No. 2012-205360.

*Primary Examiner* — Frank Font
(74) *Attorney, Agent, or Firm* — Jean C. Edwards, Esq.; Edwards Neils PLLC

(57) ABSTRACT

A laminated optical film which exhibit a high front contrast ratio and even brightness, improve viewing angle characteristics of a liquid crystal display of a horizontal alignment mode, and have high durability.

A laminated optical film comprising: a B layer; and a C layer, wherein the B layer satisfies the following three formulae (Ib) to (IIIb), the C layer satisfies the following two formulae (Ic) and (IIc), and the absolute value |ΔSP value| of a difference in SP value between the primary components of the B and C layers is not more than 1.5, the SP value being determined by Hoy's method.

$1.0 \leq Nz \leq 3.0;$ (Ib):

$70 \text{ nm} \leq Re\,(550); \text{ and}$ (IIb):

$0 \text{ nm} \leq Rth\,(550) \leq 200 \text{ nm},$ (IIIb):

$Re\,(550) \leq 10 \text{ nm}; \text{ and}$ (Ic):

$-200 \text{ nm} \leq Rth\,(550) \leq -50 \text{ nm}$ (IIc):

20 Claims, 2 Drawing Sheets

(51) Int. Cl.
  *B32B 7/02* (2006.01)
  *B32B 23/04* (2006.01)
  *B32B 27/06* (2006.01)
  *G02F 1/13363* (2006.01)
  *G02B 27/28* (2006.01)

(56) References Cited

U.S. PATENT DOCUMENTS

| | | | |
|---|---|---|---|
| 8,298,676 B2 | 10/2012 | Kato et al. | |
| 2008/0218671 A1* | 9/2008 | Nakamura | 349/117 |
| 2008/0254237 A1* | 10/2008 | Omatsu et al. | 428/1.31 |
| 2010/0075139 A1 | 3/2010 | Kato et al. | |
| 2011/0193260 A1* | 8/2011 | Takeda et al. | 264/213 |

FOREIGN PATENT DOCUMENTS

| | | |
|---|---|---|
| JP | 2006-520008 A | 8/2006 |
| JP | 2007-148099 A | 6/2007 |
| JP | 2009-168900 A | 7/2009 |
| JP | 2010-080237 A | 4/2010 |
| WO | WO 2005/065057 A2 | 7/2005 |

* cited by examiner

LAMINATED OPTICAL FILM, AND POLARIZING PLATE AND LIQUID CRYSTAL DISPLAY INCLUDING THE SAME

The present application claims the benefit of priority from Japanese Patent Application No. 216236/2011, filed on Sep. 30, 2011, and Japanese Patent Application No. 205360/2012, filed on Sep. 19, 2012, the content of which are herein incorporated by reference in their entirety.

BACKGROUND OF THE INVENTION

Field of the Invention

The present invention relates to laminated optical films useful as optical films for liquid crystal displays of horizontal-alignment modes, for example, in-plane-switching (IPS) modes and fringe-field-switching (FFS) modes. The present invention also relates to polarizing plates and liquid crystal displays including the laminated optical films.

It is known that a laminate including a negative biaxial film and a positive C-plate effectively improves viewing angle characteristics of liquid crystal displays of horizontal-alignment modes, such as IPS modes (for instance, see U.S. Pat. No. 7,283,189). Unfortunately, the negative biaxial film and the positive C-plate have different optical characteristics; hence, it is practically difficult to integrate the negative biaxial film with the positive C-plate into a laminated film without impairing their optical characteristics. For this reason, techniques to stably produce such a laminated film are still in the process of developing.

Examples of the positive C-plate include a homeotropically aligned liquid crystal layer as disclosed in U.S. Pat. No. 7,283,189. Although a liquid crystal layer is generally formed by coating, it is difficult to homeotropically and uniformly align liquid crystal molecules. In view of such a circumstance, various technical approaches have been attempted to control the molecular alignment (for example, see JP-A-2002-333524). However, use of a laminated film including the homeotropically aligned liquid crystal layer in a liquid crystal display causes a low contrast ratio and uneven brightness on the display in some cases, leading to demands for solution of such problems.

Although the positive C-plate can be produced from a negatively birefringent polymeric material (e.g., see JP-A-2009-168900), use of the positive C-plates produced from the negatively birefringent polymeric material also causes a low contrast ratio and uneven brightness in some cases, similarly leading to demands for solution of such problems.

SUMMARY OF THE INVENTION

As described above, in the case where a traditional positive C-plate is actually used in a useful form as an optical film of a liquid crystal display of a horizontal alignment mode, in other words, in a form of a laminate with a negative biaxial film, the device has problems to be solved, i.e., a low front contrast ratio and uneven brightness. Furthermore, in general, the positive C-plate and the negative biaxial film are primarily composed of different materials to provide different optical characteristics, and adhesion therebetween is likely to be reduced, resulting in low durability.

The present invention provides solutions for the above-mentioned disadvantages.

In particular, it is an object of the present invention to provide a laminated optical film and a polarizing plate which have a high front contrast ratio and even brightness, improve viewing angle characteristics of a liquid crystal display of a horizontal alignment mode, and have high durability.

It is another object of the present invention to provide a liquid crystal display of a horizontal alignment mode which exhibits a high front contrast ratio, even brightness, and satisfactory viewing angle characteristics.

The inventor has conducted extensive studies to solve the problems described above and found that a reduction in the absolute value of a difference ($\Delta SP$) in solubility parameter (SP) between the primary components of a positive C-plate and a negative biaxial film contributes to a solution of the above-mentioned problems, and this finding has been further developed to complete the present invention. A $\Delta SP$ value gives an indication of affinity between the components, and a smaller $\Delta SP$ value indicates higher affinity. In the present invention, it is believed that combined use of materials having small $\Delta SP$ values as the primary components of two layers enhances their compatibility at the interface between these two layers and can therefore keep the interface in a good state, leading to a solution of the above-mentioned problems. In particular, the inventor has found that a $\Delta SP$ value of 1.5 or lower can keep the interface between the two layers in a good state, enhance adhesion between these layers, and improve the durability of the laminate itself and then accomplished the present invention.

[1] A laminated optical film comprising:
a B layer; and
a C layer, wherein
the B layer satisfies the following three formulae (Ib) to (IIIb):

$$1.0 \leq Nz \leq 3.0; \qquad \text{(Ib)}$$

$$70 \text{ nm} \leq Re(550); \text{ and} \qquad \text{(IIb)}$$

$$0 \text{ nm} \leq Rth(550) \leq 200 \text{ nm}, \qquad \text{(IIIb)}$$

the C layer satisfies the following two formulae (Ic) and (IIc):

$$Re(550) \leq 10 \text{ nm; and} \qquad \text{(Ic)}$$

$$-200 \text{ nm} \leq Rth(550) \leq -50 \text{ nm, and} \qquad \text{(IIc)}$$

absolute value $|\Delta SP \text{ value}|$ of a difference in SP value between primary components of the B and C layers is not more than 1.5, the SP value being determined by Hoy's method.

[2] The laminated optical film of [1], wherein the primary component of the B layer is cellulose acetate having a degree of substitution of 2.0 to 2.8.

[3] The laminated optical film according to any one of [1] and [2], wherein the primary component of the B layer is cellulose acetate having a degree of substitution of 2.2 to 2.5.

[4] The laminated optical film of any one of [1] to [3], wherein the B layer has a photoelastic coefficient of not more than $40 \times 10^{-12}$ [/Pa].

[5] The laminated optical film of any one of [1] to [4], wherein the C layer comprises an organic polymer as a primary component.

[6] The laminated optical film of any one of [1] to [4], wherein the primary component of the C layer is rod-like liquid crystal, and molecules of the rod-like liquid crystal are fixed in a homeotropic alignment.

[7] The laminated optical film of any one of [1] to [6], wherein the B and C layers adjoin each other.

[8] The laminated optical film of any one of [1] to [7], wherein at least one of the B and C layers is formed by coating.

[9] The laminated optical film of any one of [1] to [8], wherein the laminated optical film has a total thickness of 80 μm or lower.

[10] A polarizing plate comprising:
a polarizer; and
the laminated optical film of any one of [1] to [9].

[11] A liquid crystal display of a horizontal-alignment mode, the liquid crystal display comprising:
the laminated optical film of any one of [1] to [9].

An aspect of the present invention provides a laminated optical film and a polarizing plate which exhibit a high front contrast ratio and even brightness, improve viewing angle characteristics of a liquid crystal display of a horizontal alignment mode, and have high durability.

Another aspect of the present invention provides a liquid crystal display of a horizontal-alignment mode which exhibits a high front contrast ratio, even brightness, and satisfactory viewing angle characteristics.

BEST MODE FOR CARRYING OUT THE INVENTION

Figure 1:
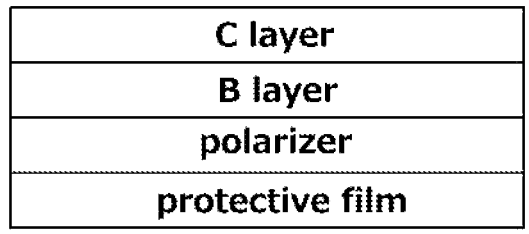
FIG. 1 is a schematic cross-sectional view illustrating a polarizing plate of an embodiment of the present invention.

The invention is described in detail hereinunder. In this description, the numerical range expressed by the wording "a number to another number" means the range that falls between the former number indicating the lowermost limit of the range and the latter number indicating the uppermost limit thereof. First described are the terms used in this description.

In this description, $Re(\lambda)$ and $Rth(\lambda)$ are retardation (nm) in plane and retardation (nm) along the thickness direction, respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments). The selection of the measurement wavelength may be conducted according to the manual-exchange of the wavelength-selective-filter or according to the exchange of the measurement value by the program.

When a film to be analyzed is expressed by a monoaxial or biaxial index ellipsoid, $Rth(\lambda)$ of the film is calculated as follows.

$Rth(\lambda)$ is calculated by KOBRA 21ADH or WR on the basis of the six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (1) and (2):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (1)$$

$Re(\theta)$ represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$Rth = \{(nx+ny)/2 - nz\} \times d \quad (2):$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then $Rth(\lambda)$ of the film may be calculated as follows:

$Re(\lambda)$ of the film is measured around the slow axis (judged by KOBRA 21ADH or WR) as the in-plane inclination axis (rotation axis), relative to the normal direction of the film from −50 degrees up to +50 degrees at intervals of degrees, in 11 points in all with a light having a wavelength of λ nm applied in the inclined direction; and based on the thus-measured retardation values, the estimated value of the mean refractive index and the inputted film thickness value, $Rth(\lambda)$ of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59). KOBRA 21ADH or WR calculates nx, ny and nz, upon enter of the hypothetical values of these mean refractive indices and the film thickness. On the basis of thus-calculated nx, ny and nz, $Nz = (nx-nz)/(nx-ny)$ is further calculated.

The refractive index is herein measured at a wavelength of 550 nm unless otherwise specified.

1. Laminated Optical Film

The present invention relates to a laminated optical film including a B layer and a C layer, the B layer satisfying the following three formulae (Ib) to (IIIb):

$$1.0 \leq Nz \leq 3.0; \qquad \text{(Ib)}$$

$$70 \text{ nm} \leq Re(550); \text{ and} \qquad \text{(IIb)}$$

$$0 \text{ nm} \leq Rth(550) \leq 200 \text{ nm, and} \qquad \text{(IIIb)}$$

the C layer satisfying the following two formulae (Ic) and (IIc):

$$Re(550) \leq 10 \text{ nm; and} \qquad \text{(Ic)}$$

$$-200 \text{ nm} \leq Rth(550) \leq -50 \text{ nm}, \qquad \text{(IIc)}$$

wherein the absolute value of a difference in SP value between the primary components of the B and C layers (|ΔSP value| is not more than 1.5.

The B layer is a negative biaxial layer which satisfies the formulae (Ib) to (IIIb), and the C layer is a positive C-plate which satisfies the formulae (Ic) and (IIc). The laminated optical film of the present invention has optical characteristics which can improve viewing angle characteristics of liquid crystal displays of horizontal-alignment modes. Actual use of a traditional laminated optical film having a similar structure in a liquid crystal display of a horizontal-alignment mode has caused problems such as uneven brightness, a low front contrast ratio, and low durability due to unsatisfactory adhesion between the two layers. Since the laminated optical film of the present invention exhibits a |ΔSP value| of the primary components of the B and C layers within the above-mentioned range, these two layers are compatible with each other to form a satisfactory interfacial state without formation of a distinct interface. Although incident polarized light is depolarized at the interface between two conventional layers to decrease a front contrast ratio (CR) or cause other problems, the present invention enables formation of high-quality images (high-quality images with a high front contrast ratio and even contrast) without depolarization. Furthermore, such a satisfactory interfacial state between the two layers can improve adhesion between these layers.

As the ΔSP value of the primary components of the layers decreases (for example, a |ΔSP value| of less than 2.6), the distinct interface between the layers disappears. This suggests compatibilization between these layers to some extent; however, the compatibilization does not always provide a reduction in depolarization or an improvement in adhesion, and an interfacial state with an insufficient enhancement in the compatibility rather results in an increase in depolarization. In particular, at a |ΔSP value| of greater than 1.5, an enhancement in interfacial compatibility does not practically contributes to an improvement in a front CR and a reduction in uneven contrast, and even results in practically insufficient adhesion and a low front CR to the contrary. At a |ΔSP value| of 1.5 or lower, the compatibility between the layers is sufficiently enhanced and practically contributes to an improvement in a front CR, a reduction in uneven contrast, and an improvement in adhesion.

In order to provide such advantageous effects, the |ΔSP value|, the absolute value of a difference in SP value between the primary components of the B and C layers, is not more than 1.5. The |ΔSP value| is preferably not more than 1.2, more preferably not more than 1.0, and further preferably not more than 0.8. A smaller |ΔSP value| gives more noticeable advantageous effects. If dissimilar materials are used, the lower limit of the |ΔSP value| is approximately 0.1.

The primary components of the B and C layers may have any SP value provided that the |ΔSP value| is within the above-described ranges, and relative amounts of the primary components of the B and C layers are not specifically limited. In general, SP values of the primary components of the B and C layers are approximately in the range of 17 to 27.

The term "SP value" herein refers to the value of the solubility parameter determined by Hoy's method. Hoy's method is disclosed in *POLYMER HANDBOOK FOURTH EDITION*. The |ΔSP value| is the absolute value ($|SP_b - SB_c|$) of a difference in SP value ($SP_b$ and $SB_c$) determined by Hoy's method between the primary components of the B and C layers.

Another layer (intermediate layer) may be provided between the B and C layers. The intermediate layer preferably exhibits isotropic properties that have no optical effect on the other components and exhibit high affinity to the B and C layers in view of adhesion thereto; hence, the intermediate layer can be composed of a material selected from materials exhibiting an SP value close to those of the B and C layers.

If the SP value of the intermediate layer is closer to that of the B layer rather than that of the C layer, the adhesion between the intermediate layer and the B layer is relatively higher than that between the intermediate layer and the C layer. In order to enhance the adhesion between the intermediate layer and the C layer, a compound which generates hydrophilic interaction (e.g., hydrogen bond) with the intermediate layer can be added to the composition of the C layer to form the firm interface therebetween.

The intermediate layer may be composed of a single material or a blend of different materials, and the SP value of the intermediate layer composed of the blend can be determined by the sum of the products of SP values of individual components and their proportions.

In a blend of materials A and B (A+B=100),

*SP* value of blend=(*SP* value of component $A$)×$A$/100+(*SP* value of component $B$)×$B$/100

The primary components of the B and C layers may be any materials that can form layers satisfying the above-mentioned optical characteristics and are used in combination so as to give a |ΔSP value| within the above-described ranges. Non-liquid crystal materials or liquid crystal materials may be used. Preferably, the B and C layers are primarily composed of organic polymers, which impart proper hardness to the B and C layers. The term "organic polymers" herein refers to compounds prepared by polymerization curing of either a resin or a polymerizable composition. For example, the layer may be formed by curing a curable composition primarily composed of a low-molecular-weight material. In this case, the primary component of the layer formed by curing a curable composition primarily composed of a low-molecular-weight material is a polymer of the low-molecular-weight material contained in the cured layer.

In an especially effective embodiment of the present invention, at least any one of the B and C layers is formed by coating, which can promote dissolution between these layers to form a good interfacial state. In another effective embodiment of the present invention, any one of the B and C layers is formed by coating whereas the other is a polymer film supporting the coated layer. The present invention however should not be limited to these embodiments.

It is believed that uneven brightness and a low contrast ratio depend on an interfacial state between layers and also result from implementation of an optical film to a liquid crystal panel. Since the B layer especially exhibits large retardation Re, it is believed that implementation of the optical film to a liquid crystal panel is a reason for the occurrence of the uneven brightness or other problems. A low photoelastic coefficient of the B layer is preferred to overcome such a problem, and, in particular, the B layer preferably has a photoelastic coefficient of $40 \times 10^{-12}$/Pa or lower, more preferably $30 \times 10^{-12}$/Pa or lower. The B layer preferably has a lower photoelastic coefficient to prevent the occurrence of uneven brightness or other problems; however, the lower limit of the photoelastic coefficient seems to be about 1 in currently used materials. Examples of films having a photoelastic coefficient of $40 \times 10^{-12}$/Pa or lower include cellulose acylate films (for instance, cellulose acetate described later has a photoelastic coefficient of approximately $20 \times 10^{-12}$/Pa), cyclic olefin films, and films primarily composed of, for instance, polymethyl methacrylate. Examples of films with a photoelastic coefficient of $40 \times 10^{-12}$/Pa or higher include films primarily composed of polycarbonate resins.

The term "photoelastic coefficient" herein refers to the average of the photoelastic coefficients in directions orthogonal to each other. In continuous production of films, for instance, this is the average value of the photoelastic coefficients measured in the longitudinal direction (MD) of the film and in the direction (TD) orthogonal thereto.

Materials suitable for the primary components of the B and C layers satisfying the above-mentioned optical characteristics will now be described. The term "primary component" herein indicates a component of the highest content.

B Layer

The B layer is a negative biaxial layer which satisfies the following three formulae:

$$1.0 \leq Nz \leq 3.0; \quad \text{(Ib)}$$

$$70 \text{ nm} \leq Re(550); \text{ and} \quad \text{(IIb)}$$

$$0 \text{ nm} \leq Rth(550) \leq 200 \text{ nm, and} \quad \text{(IIIb)}$$

In terms of improvements in viewing angle characteristics of liquid crystal displays of horizontal-alignment modes, the B layer preferably satisfies the following three formulae:

$$1.05 \leq Nz \leq 2.5; \quad \text{(Ib')}$$

$$70 \text{ nm} \leq Re(550) \leq 170 \text{ nm; and} \quad \text{(IIb')}$$

$$20 \text{ nm} \leq Rth(550) \leq 150 \text{ nm, and} \quad \text{(IIIb')}$$

more preferably satisfies the following three formulae:

$$1.1 \leq Nz \leq 2.0; \quad \text{(Ib')}$$

$$80 \text{ nm} \leq Re(550) \leq 150 \text{ nm; and} \quad \text{(IIb')}$$

$$30 \text{ nm} \leq Rth(550) \leq 120 \text{ nm}. \quad \text{(IIIb')}$$

Examples of materials usable to form a layer which satisfies the above-described optical characteristics include cellulose acylate, cyclic olefin resins, polyethylene terephthalate resins, polycarbonate resins, and polymethyl methacrylate resins. Examples of the B layer include films primarily composed of cellulose acylate (hereinafter referred to as cellulose acylate films, where appropriate). Cellulose acylate films are preferred because the films have a small photoelastic coefficient and can therefore reduce uneven brightness due to implementation to liquid crystal panels, as compared to films primarily composed of polycarbonate or other materials.

Examples of cellulose used as a starting material in preparation of cellulose acylate include cotton linter and wood pulp (broadleaf pulp and coniferous pulp). Any cellulose acylate obtained from any of such starting cellulose may be used, and different types of cellulose acylate may be also used in combination in some cases. For example, the details of the cellulose usable as a starting material are described in "Plastic Zairyo Kouza (17), Cellulosic Resin" (written by Marusawa and Uda, published by Nikkan Kogyo Shimbun Ltd., 1970); and Hatsumei Kyokai Disclosure Bulletin 2001-1745 (pp. 7-8).

The glucose units contained in cellulose and having a β-1, 4-bond have free hydroxyl groups in their 2-, 3- and 6-positions. Cellulose acylate is a polymer prepared by esterification of part or all of the hydroxyl groups with acyl groups having two or more carbon atoms. The degree of acyl substitution means the percentage of esterification of the hydroxyl groups at the 2-, 3-, and 6-positions of cellulose (100% esterification provides a substitution degree of 1), and the total degree of acyl substitution, which is determined from the formula DS2+DS3+DS6 (DS2, DS3, and DS6 represent the degree of substitution of the hydroxyl groups at 2-, 3-, and 6-positions with acyl groups, respectively), is 3 at a maximum. The cellulose acylate which can be used for the B layer may have any degree of acyl substitution. In terms of film formability, the total degree of acyl substitution is preferably 2.8 or lower, more preferably 2.0 to 2.8. Since a lower total degree of acyl substitution generally leads to a higher SP value, use of a C layer primarily composed of a material with a high SP value may facilitates the adjustment of the |ΔSP value| to 1.5 or lower in some cases. Examples of the cellulose acylate having a low degree of substitution include cellulose acylate having the total degree of acyl substitution of 2.5 or lower (more preferably 2.48 or lower, and further preferably 2.46 or lower). In contrast, the excessively low total degree of substitution of the cellulose acylate is not preferred in terms of film formability and absorbency of a film. From these standpoints, preferred cellulose acylate has a total degree of acyl substitution of 2.2 to 2.5 (more preferably 2.3 to 2.46). The cellulose acylate having a low degree of acyl substitution is preferred because it provides excellent optical characteristics and can be used to form a thinner B layer having the above-mentioned optical characteristics.

The acyl group contained in cellulose acylate is a substituent represented by the formula R—C(=O)—. R may be an alkyl group, an aryl group, or an aralkyl group as a combination thereof. Examples of an alkyl group represented by R include linear, branched, and cyclic alkyl groups having 1 to 15 carbon atoms. Examples of the acyl groups having an alkyl group represented by R include a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexane carbonyl group, and an oleoyl group. If cellulose acylate contains two or more acyl groups, one of the acyl groups is preferably an acetyl group. Examples of the acyl groups having an aryl group or an aralkyl group represented by R include a benzoyl group, a naphthyl carbonyl group, and a cinnamoyl group. Among those groups, preferred are acyl groups containing alkyl groups having 1 to 4 carbon atoms, more preferred are an acetyl group, a propionyl group, and a butanoyl group, and especially preferred is an acetyl group. Cellulose acylate may be mixed fatty acid esters of cellulose containing two or more different acyl groups, and examples of such mixed fatty acid esters include cellulose acetate propionate and cellulose acetate butyrate. Cellulose acetate propionate has an SP value smaller than that of cellulose acetate and can be therefore used in combination with a primary component of the C layer exhibiting a small SP value to adjust the |ΔSP value| to 1.5 or lower in some cases.

In the case of using acid anhydride and acid chloride as an acylating agent in acylation of cellulose, organic acids, such as acetic acid and methylene chloride, are used as an organic solvent as a reaction solvent. Preferred catalysts are protic catalysts, such as sulfuric acid, in the case of using acid anhydride as an acylating agent, and basic compounds in the case of using acid chloride (e.g., $CH_3CH_2COCl$) as an acylating agent.

An example method of industrial synthesis of mixed fatty acid esters of cellulose involves acylation of cellulose with mixed organic acids components containing fatty acids corresponding to the acetyl group and any other acyl group (e.g., acetic acid, propionic acid, or valeric acid) or their acid anhydrides. Cellulose acylate used in the present invention can be synthesized by a method, for example, disclosed in JP-A-10-45804.

The B layer preferably contains cellulose acylate as a primary component, and the cellulose acylate content in the B layer is preferably 70 mass % or higher, more preferably 80 mass % or higher, and may be 100 mass %. In an embodiment in which one or more additives are added to achieve optical characteristics, the cellulose acylate content is preferably 96 mass % or lower, more preferably 98 mass % or lower.

The B layer may contain additives in addition to the primary component. The additives are added to develop, modify, or adjust optical characteristics and to improve mechanical characteristics and film formability.

Examples of the additives compounded to the cellulose acylate film include high-molecular-weight additives having a number average molecular weight of 700 to 10000. The high-molecular-weight additives are used to increase the volatilization rate of a solvent or to decrease the residual solvent content in a solvent casting process. The high-molecular-weight additives are also useful for films produced by a melt casting process to avoid coloration and a decrease in film strength. The additives further provide advantageous effects in terms of modification of film properties, such as enhancements in mechanical properties, development of flexibility and anti-water absorbability, and a reduction in moisture permeability. In addition, the high-molecular-weight additives act as an Rth-controlling agent in some cases.

The high-molecular-weight additives preferably have a number average molecular weight of not less than 700 and less than 10000, more preferably 800 to 8000, further preferably 800 to 5000, and still further preferably 1000 to 5000. The number average molecular weight within these ranges provides excellent compatibility. In particular, the high-molecular-weight additive content is preferably 4 to 30 mass %, more preferably 10 to 25 mass % relative to the cellulose acylate content.

Examples of the high-molecular-weight additives include polyester polymers, styrene polymers, acrylic polymers, and copolymers thereof. Preferred are aliphatic polyesters and aromatic polyesters.

Polyester Polymers

Polyester polymers which can be used as an additive to the B layer may be produced by a reaction of mixtures of aliphatic dicarboxylic acids having 2 to 20 carbon atoms and aromatic dicarboxylic acids having 8 to 20 carbon atoms with at least one diol selected from the group consisting of aliphatic diols having 2 to 12 carbon atoms, alkyl ether diols having 4 to 20 carbon atoms, and aromatic diols having 6 to 20 carbon atoms, both ends of the reaction product being optionally capped through a further reaction with a monocarboxylic acid, monoalcohol, or phenol. The end capping is carried out so that free carboxylic acids are not contained in the polymer, which is especially effective for the preservation property thereof. The dicarboxylic acid used for synthesis of the polyester polymers is preferably aliphatic dicarboxylic residues having 4 to 20 carbon atoms or aromatic dicarboxylic residues having 8 to 20 carbon atoms.

The aliphatic dicarboxylic acids having from 2 to 20 carbon atoms preferably used in the invention include, for example, oxalic acid, malonic acid, succinic acid, maleic acid, fumaric acid, glutaric acid, adipic acid, pimelic acid, suberic acid, azelaic acid, sebacic acid, dodecanedicarboxylic acid, 1,4-cyclohexanedicarboxylic acid, 1,8-naphthalene dicarboxylic acid, 2,8-naphthalene dicarboxylic acid, 2,6-naphthalene dicarboxylic acid.

More preferred aliphatic dicarboxylic acids in these are malonic acid, succinic acid, maleic acid, fumaric acid, glutaric acid, adipic acid, azelaic acid, 1,4-cyclohexanedicarboxylic acid. More preferred aromatic dicarboxylic acids in these are phthalic acid, terephthalic acid, isophthalic acid, 1,5-naphthalene dicarboxylic acid, and 1,4-naphthalene dicarboxylic acid. Particularly preferred aliphatic dicarboxylic acids are succinic acid, glutaric acid and adipic acid, and preferred aromatic dicarboxylic acids are phthalic acid, terephthalic acid, and isophthalic acid.

Although at least one of the above-mentioned aliphatic dicarboxylic acids and at least one of the above-mentioned aromatic dicarboxylic acids are used in combination in the present invention, the combination thereof is not specifically limited. Each component may contain two or more different acids.

The aliphatic diols or aromatic diols used for synthesis of the high-molecular-weight additive are selected from, for example, aliphatic diols having 2 to 20 carbon atoms, alkyl ether diols having 4 to 20 carbon atoms, and aromatic diols having 6 to 20 carbon atoms.

Examples of the aliphatic diol having from 2 to 20 carbon atoms include an alkyldiol and an alicyclic diol. For example, an ethandiol, 1,2-propandiol, 1,3-propandiol, 1,2-butandiol, 1,3-butandiol, 2-methyl-1,3-propandiol, 1,4-butandiol, 1,5-pentandiol, 2,2-dimethyl-1,3-propandiol (neopentyl glycol), 2,2-diethyl-1,3-propandiol (3,3-dimethylolpentane), 2-n-buthyl-2-ethyl-1,3-propandiol (3,3-dimethylolheptane), 3-methyl-1,5-pentandiol, 1,6-hexandiol, 2,2,4-trimethyl-1,3-pentandiol, 2-ethyl-1,3-hexandiol, 2-methyl-1,8-octandiol, 1,9-nonandiol, 1,10-decandiol, 1,12-octadecandiol, etc. One or more of these glycols may be used either singly or as combined mixture. Specific examples of preferred aliphatic diols include an ethandiol, 1,2-propandiol, 1,3-propandiol, 1,2-butandiol, 1,3-butandiol, 2-methyl-1,3-propandiol, 1,4-butandiol, 1,5-pentandiol, 3-methyl-1,5-pentandiol, 1,6-hexandiol, 1,4-cyclohexandiol, 1,4-cyclohexandimethanol. Particularly preferred examples include ethandiol, 1,2-propandiol, 1,3-propandiol, 1,2-butandiol, 1,3-butandiol, 1,4-butandiol, 1,5-pentandiol, 1,6-hexandiol, 1,4-cyclohexandiol, 1,4-cyclohexanedimethanol.

Specific examples of preferred alkyl ether diols having from 4 to 20 carbon atoms are polytetramethylene ether glycol, polyethylene ether glycol, polypropylene ether glycol, and combinations of these. The average degree of polymerization is not limited in particular, and it is preferably from 2 to 20, more preferably from 2 to 10, further preferably from 2 to 5, especially preferably from 2 to 4. As these examples, Carbowax resin, Pluronics resin and Niax resin are commercially available as typically useful polyether glycols.

Examples of the aromatic diols having 6 to 20 carbon atoms include, but are not limited to, bisphenol A, 1,2-hydroxybenzene, 1,3-hydroxybenzene, 1,4-hydroxybenzene, and 1,4-benzene dimethanol; and preferred are bisphenol A, 1,4-hydroxybenzene, and 1,4-benzene dimethanol.

Especially preferred are high-molecular-weight additives having terminals capped with alkyl or aromatic groups. Such high-molecular-weight additives are effective against aging at high temperature and humidity because protection of the terminals with hydrophobic functional groups can retard the hydrolysis of ester groups.

Both terminals of the polyester additive in the present invention are preferably protected with monoalcohol or monocarboxylic acid moieties so that the polyester additive does not have terminal carboxylic or hydroxyl groups.

In this case, preferred monoalcohols are substituted or unsubstituted monoalcohols having 1 to 30 carbon atoms, and examples of such monoalcohols include aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, and oleyl alcohol; and substituted alcohols such as benzyl alcohol and 3-phenylpropanol.

Preferred alcohols used for the end capping are methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol, and benzyl alcohol; and especially preferred are methanol, ethanol, propanol, isobutanol, cyclohexyl alcohol, 2-ethylhexyl alcohol, isononyl alcohol, and benzyl alcohol.

In the end capping with monocarboxylic acid groups, monocarboxylic acids are preferably selected from substituted or unsubstituted monocarboxylic acids having 1 to 30 carbon atoms. Such monocarboxylic acids may be aliphatic monocarboxylic acids or aromatic monocarboxylic acids. Preferred examples of the aliphatic monocarboxylic acids include acetic acid, propionic acid, butanoic acid, caprylic acid, caproic acid, decanoic acid, dodecanoic acid, stearic acid, and oleic acid. Examples of the aromatic monocarboxylic acids include benzoic acid, p-tert-butylbenzoic acid, p-tert-amylbenzoic acid, ortho-toluic acid, meta-toluic acid, para-toluic acid, dimethylbenzoic acid, ethylbenzoic acid, normal-propylbenzoic acid, aminobenzoic acid, and acetoxybenzoic acid. These may be used alone or in combination.

The polymer additives used in the present invention can be easily synthesized by either a hot melt condensation process through polyesterification or transesterification of dicarboxylic acid with diol and/or monocarboxylic acid or monoalcohol for end capping or an interfacial condensation process of chlorides of those acids with glycols, in an ordinary manner. The polyester additives are described in detail in "*TENKAZAI SONO RIRON TO OHYOH*" [first original edition, Koichi Murai. (Mar. 1, 1973). SAIWAI SHOBO.]. The materials described in JP-A-05-155809, JP-A-05-155810, JP-A-05-197073, JP-A-2006-259494, JP-A-07-330670, JP-A-2006-342227, and JP-A-2007-003679 are also usable in the present invention.

Although specific examples of the polyester polymers used in the present invention will now be described, the polyester polymers used in the present invention should not be limited thereto.

TABLE 1

| | Dicarboxylic acid | | | Diol | | | Number |
|---|---|---|---|---|---|---|---|
| | Aromatic dicarboxylic acid | Aliphatic dicarboxylic acid | Dicarboxylic acid ratio (mol %) | Aliphatic diol | Diol ratio (mol %) | Terminal | average molecular weight |
| P-1 | — | AA | 100 | Ethanediol | 100 | Hydroxyl group | 1000 |
| P-2 | — | AA | 100 | Ethanediol | 100 | Hydroxyl group | 2000 |
| P-3 | — | AA | 100 | Propanediol | 100 | Hydroxyl group | 2000 |
| P-4 | — | AA | 100 | Butanediol | 100 | Hydroxyl group | 2000 |
| P-5 | — | AA | 100 | Hexanediol | 100 | Hydroxyl group | 2000 |
| P-6 | — | AA/SA | 60/40 | Ethanediol | 100 | Hydroxyl group | 900 |
| P-7 | — | AA/SA | 60/40 | Ethanediol | 100 | Hydroxyl group | 1500 |
| P-8 | — | AA/SA | 60/40 | Ethanediol | 100 | Hydroxyl group | 1800 |
| P-9 | — | SA | 100 | Ethanediol | 100 | Hydroxyl group | 1500 |
| P-10 | — | SA | 100 | Ethanediol | 100 | Hydroxyl group | 2300 |
| P-11 | — | SA | 100 | Ethanediol | 100 | Hydroxyl group | 6000 |
| P-12 | — | SA | 100 | Ethanediol | 100 | Hydroxyl group | 1000 |
| P-13 | PA | SA | 50/50 | Ethanediol | 100 | Hydroxyl group | 1000 |
| P-14 | PA | SA | 50/50 | Ethanediol | 100 | Hydroxyl group | 1800 |
| P-15 | PA | AA | 50/50 | Ethanediol | 100 | Hydroxyl group | 2300 |
| P-16 | PA | SA/AA | 40/30/30 | Ethanediol | 100 | Hydroxyl group | 1000 |
| P-17 | PA | SA/AA | 50/20/30 | Ethanediol | 100 | Hydroxyl group | 1500 |
| P-18 | PA | SA/AA | 50/30/20 | Ethanediol | 100 | Hydroxyl group | 2600 |
| P-19 | TPA | SA | 50/50 | Ethanediol | 100 | Hydroxyl group | 1000 |
| P-20 | TPA | SA | 50/50 | Ethanediol | 100 | Hydroxyl group | 1200 |
| P-21 | TPA | AA | 50/50 | Ethanediol | 100 | Hydroxyl group | 2100 |
| P-22 | TPA | SA/AA | 40/30/30 | Ethanediol | 100 | Hydroxyl group | 1000 |
| P-23 | TPA | SA/AA | 50/20/30 | Ethanediol | 100 | Hydroxyl group | 1500 |
| P-24 | TPA | SA/AA | 50/30/20 | Ethanediol | 100 | Hydroxyl group | 2100 |
| P-25 | PA/TPA | AA | 15/35/50 | Ethanediol | 100 | Hydroxyl group | 1000 |
| P-26 | PA/TPA | AA | 20/30/50 | Ethanediol | 100 | Hydroxyl group | 1000 |
| P-27 | PA/TPA | SA/AA | 15/35/20/30 | Ethanediol | 100 | Hydroxyl group | 1000 |
| P-28 | PA/TPA | SA/AA | 20/30/20/30 | Ethanediol | 100 | Hydroxyl group | 1000 |
| P-29 | PA/TPA | SA/AA | 10/50/30/10 | Ethanediol | 100 | Hydroxyl group | 1000 |
| P-30 | PA/TPA | SA/AA | 5/45/30/20 | Ethanediol | 100 | Hydroxyl group | 1000 |
| P-31 | — | AA | 100 | Ethanediol | 100 | Acetyl ester residue | 1000 |
| P-32 | — | AA | 100 | Ethanediol | 100 | Acetyl ester residue | 2000 |

TABLE 1-continued

| | Dicarboxylic acid | | | Diol | | | Number |
|---|---|---|---|---|---|---|---|
| | Aromatic dicarboxylic acid | Aliphatic dicarboxylic acid | Dicarboxylic acid ratio (mol %) | Aliphatic diol | Diol ratio (mol %) | Terminal | average molecular weight |
| P-33 | — | AA | 100 | Propanediol | 100 | Acetyl ester residue | 2000 |
| P-34 | — | AA | 100 | Butanediol | 100 | Acetyl ester residue | 2000 |
| P-35 | — | AA | 100 | Hexanediol | 100 | Acetyl ester residue | 2000 |
| P-36 | — | AA/SA | 60/40 | Ethanediol | 100 | Acetyl ester residue | 900 |

TABLE 2

| | Dicarboxylic acid | | | Diol | | | Number |
|---|---|---|---|---|---|---|---|
| | Aromatic dicarboxylic acid | Aliphatic dicarboxylic acid | Dicarboxylic acid ratio (mol %) | Aliphatic diol | Diol ratio (mol %) | Terminal | average molecular weight |
| P-37 | — | AA/SA | 60/40 | Ethanediol | 100 | Acetyl ester residue | 1000 |
| P-38 | — | AA/SA | 60/40 | Ethanediol | 100 | Acetyl ester residue | 2000 |
| P-39 | — | SA | 100 | Ethanediol | 100 | Acetyl ester residue | 1000 |
| P-40 | — | SA | 100 | Ethanediol | 100 | Acetyl ester residue | 3000 |
| P-41 | — | SA | 100 | Ethanediol | 100 | Acetyl ester residue | 5500 |
| P-42 | — | SA | 100 | Ethanediol | 100 | Acetyl ester residue | 1000 |
| P-43 | PA | SA | 50/50 | Ethanediol | 100 | Acetyl ester residue | 1000 |
| P-44 | PA | SA | 50/50 | Ethanediol | 100 | Acetyl ester residue | 1500 |
| P-45 | PA | AA | 50/50 | Ethanediol | 100 | Acetyl ester residue | 2000 |
| P-46 | PA | SA/AA | 40/30/30 | Ethanediol | 100 | Acetyl ester residue | 1000 |
| P-47 | PA | SA/AA | 33/33/34 | Ethanediol | 100 | Benzoic acid | 1000 |
| P-48 | PA | SA/AA | 50/20/30 | Ethanediol | 100 | Acetyl ester residue | 1500 |
| P-49 | PA | SA/AA | 50/30/20 | Ethanediol | 100 | Acetyl ester residue | 2000 |
| P-50 | TPA | SA | 50/50 | Ethanediol | 100 | Acetyl ester residue | 1000 |
| P-51 | TPA | SA | 50/50 | Ethanediol | 100 | Acetyl ester residue | 1500 |
| P-52 | TPA | SA | 45/55 | Ethanediol | 100 | Acetyl ester residue | 1000 |
| P-53 | TPA | AA | 50/50 | Ethanediol | 100 | Acetyl ester residue | 2200 |
| P-54 | TPA | SA | 35/65 | Ethanediol | 100 | Acetyl ester residue | 1000 |
| P-55 | TPA | SA/AA | 40/30/30 | Ethanediol | 100 | Acetyl ester residue | 1000 |
| P-56 | TPA | SA/AA | 50/20/30 | Ethanediol | 100 | Acetyl ester residue | 1500 |
| P-57 | TPA | SA/AA | 50/30/20 | Ethanediol | 100 | Acetyl ester residue | 2000 |
| P-58 | TPA | SA/AA | 20/20/60 | Ethanediol | 100 | Acetyl ester residue | 1000 |
| P-59 | PA/TPA | AA | 15/35/50 | Ethanediol | 100 | Acetyl ester residue | 1000 |
| P-60 | PA/TPA | AA | 25/25/50 | Ethanediol | 100 | Acetyl ester residue | 1000 |
| P-61 | PA/TPA | SA/AA | 15/35/20/30 | Ethanediol | 100 | Acetyl ester residue | 1000 |
| P-62 | PA/TPA | SA/AA | 20/30/20/30 | Ethanediol | 100 | Acetyl ester residue | 1000 |
| P-63 | PA/TPA | SA/AA | 10/50/30/10 | Ethanediol | 100 | Acetyl ester residue | 1000 |
| P-64 | PA/TPA | SA/AA | 5/45/30/20 | Ethanediol | 100 | Acetyl ester residue | 1000 |
| P-65 | PA/TPA | SA/AA | 5/45/20/30 | Ethanediol | 100 | Acetyl ester residue | 1000 |
| P-66 | IPA | AA/SA | 20/40/40 | Ethanediol | 100 | Acetyl ester residue | 1000 |
| P-67 | 2,6-NPA | AA/SA | 20/40/40 | Ethanediol | 100 | Acetyl ester residue | 1200 |
| P-68 | 1,5-NPA | AA/SA | 20/40/40 | Ethanediol | 100 | Acetyl ester residue | 1200 |
| P-69 | 1,4-NPA | AA/SA | 20/40/40 | Ethanediol | 100 | Acetyl ester residue | 1200 |
| P-70 | 1,8-NPA | AA/SA | 20/40/40 | Ethanediol | 100 | Acetyl ester residue | 1200 |
| P-71 | 2,8-NPA | AA/SA | 20/40/40 | Ethanediol | 100 | Acetyl ester residue | 1200 |

In Tables 1 and 2, the following abbreviations are used: PA for phthalic acid, TPA for terephthalic acid, IPA for isophthalic acid, AA for adipic acid, SA for succinic acid, 2,6-NPA for 2,6-naphthalene dicarboxylic acid, 2,8-NPA for 2,8-naphthalene dicarboxylic acid, 1,5-NPA for 1,5-naphthalene dicarboxylic acid, 1,4-NPA for 1,4-naphthalene dicarboxylic acid, and 1,8-NPA for 1,8-naphthalene dicarboxylic acid.

Sugar Ester Compounds

Examples of the additives which can be contained in a film as the B layer include sugar ester compounds.

Addition of sugar ester compounds to a cellulose acylate film can prevent an increase in a haze value due to wet heat treatment after a stretching process without impairing development of optical characteristics.

—Sugar Residue—

The sugar ester compound means a compound where at least one substitutable compound (for example, hydroxyl group, carboxyl group) in the monose or polyose constituting the compound is ester-bonded to at least one substituent therein. Specifically, the sugar ester compound as referred to herein includes sugar derivatives in a broad sense of the word, and for example, includes compounds having a sugar residue as the structural unit thereof such as gluconic acid. Concretely, the sugar ester compound includes an ester of glucose and a carboxylic acid, and an ester of gluconic acid and an alcohol.

The substitutable group in the monose or polyose constituting the sugar ester compound is preferably a hydroxyl group.

The sugar ester compound includes a monose or polyose-derived structure (hereinafter this may be referred to as a sugar residue) that constitutes the sugar ester compound. The structure per monose of the sugar residue is referred to as the structural unit of the sugar ester compound. The structural unit of the sugar ester compound preferably includes a pyranose structural unit or a furanose structural unit, more preferably, all the sugar residues are pyranose structural units or furanose structural units. In case where the sugar ester is formed of a polyose, it preferably includes both a pyranose structural unit and a furanose structural unit.

The sugar residue of the sugar ester compound may be a pentose-derived one or a hexose-derived one, but is preferably a hexose-derived one.

Preferably, the number of the structural units contained in the sugar ester compound is from 1 to 12, more preferably from 1 to 6, even more preferably 1 or 2.

In the invention, preferably, the sugar ester compound contains from 1 to 12 pyranose structural units or furanose structural units in which at least one hydroxyl group is esterified, even more preferably, one or two pyranose structural units or furanose structural units in which at least one hydroxyl group is esterified.

Examples of monoses or polyoses containing from 2 to 12 monose units include, for example, erythrose, threose, ribose, arabinose, xylose, lyxose, arose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, maltopentaose, verbascose, maltohexaose, α-cyclodextrin, β-cyclodextrin, γ-cyclodextrin, δ-cyclodextrin, xylitol, sorbitol, etc.

Preferred are ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, sorbitol; more preferred are arabinose, xylose, glucose, fructose, mannose, galactose, maltose, cellobiose, sucrose, β-cyclodextrin, γ-cyclodextrin; and even more preferred are xylose, glucose, fructose, mannose, galactose, maltose, cellobiose, sucrose, xylitol, sorbitol. The sugar ester compound has a glucose skeleton or a sucrose skeleton, which is described in [0059] in JP-A 2009-1696 as the compound 5 therein. The sugar ester compound of the type is, as compared with the sugar ester compound having a maltose skeleton used in Examples in the patent reference, especially preferred from the viewpoint of the compatibility thereof with polymer.

—Structure of Substituent—

More preferably, the sugar ester compound for use in the invention has, including the substituent therein, a structure represented by the following formula (1):

$(OH)_p\text{-}G\text{-}(L^1\text{-}R^{11})_q(O\text{-}R^{12})_r$ (1)

wherein G represents a sugar residue; $L^1$ represents any one of —O—, —CO— or —NR$^{13}$—; $R^{11}$ represents a hydrogen atom or a monovalent substituent; $R^{12}$ represents a monovalent substituent bonding to the formula via an ester bond; p, q and r each independently indicate an integer of 0 or more, and p+q+r is equal to the number of the hydroxyl groups on the presumption that G is an unsubstituted sugar group having a cyclic acetal structure.

The preferred range of G is the same as the preferred range of the above-mentioned sugar residue.

$L^1$ is preferably —O— or —CO—, more preferably —O—. When $L^1$ is —O—, it is more preferably an ether bond or ester bond-derived linking group, even more preferably an ester bond-derived linking group.

In case where the formula has plural $L^1$'s, then they may be the same or different.

Preferably, at least one of $R^{11}$ and $R^{12}$ has an aromatic ring.

In particular, in case where $L^1$ is —O— (or that is, in case where the hydroxyl group in the above-mentioned sugar ester compound is substituted with $R^{11}$ and $R^{12}$), preferably, $R^{11}$, $R^{12}$ and $R^{13}$ are selected from a substituted or unsubstituted acyl group, a substituted or unsubstituted aryl group, a substituted or unsubstituted alkyl group, or a substituted or unsubstituted amino group, more preferably from a substituted or unsubstituted acyl group, a substituted or unsubstituted alkyl group, or a substituted or unsubstituted aryl group, even more preferably from an unsubstituted acyl group, a substituted or unsubstituted alkyl group, or an unsubstituted aryl group.

In case where the formula has plural $R^{11}$'s, $R^{12}$'s and $R^{13}$'s, they may be the same or different.

p is an integer of 0 or more, and its preferred range is the same as the preferred range of the number of the hydroxyl groups per the monose unit to be mentioned below, however, in the invention, p is preferably zero (0).

r is preferably a number larger than the number of the pyranose structural units or the furanose structural units contained in G.

q is preferably 0.

p+q+r is equal to the number of the hydroxyl groups on the presumption that G is an unsubstituted sugar group having a cyclic acetal structure, and therefore, the uppermost limit of these p, q and r is specifically defined depending on the structure of G.

Preferred examples of the substituent of the sugar ester compound include an alkyl group (preferably an alkyl group having from 1 to 22 carbon atoms, more preferably from 1 to 12 carbon atoms, even more preferably from 1 to 8 carbon atoms, for example, a methyl group, an ethyl group, a propyl group, a hydroxyethyl group a hydroxypropyl group, a 2-cyanoethyl group, a benzyl group), an aryl group (preferably an aryl group having from 6 to 24 carbon atoms, more preferably from 6 to 18 carbon atoms, even more preferably from 6 to 12 carbon atoms, for example, a phenyl group, a naphthyl group), an acyl group (preferably an acyl group having from 1 to 22 carbon atoms, more preferably from 2 to 12 carbon atoms, even more preferably from 2 to 8 carbon atoms, for example, an acetyl group, a propionyl group, a butyryl group, a pentanoyl group, a hexanoyl group, an octanoyl group, a benzoyl group, a toluoyl group, a phthalyl group), an amide group (preferably an amide group having from 1 to 22 carbon atoms, more preferably from 2 to 12 carbon atoms, even more preferably from 2 to 8 carbon atoms, for example, a formamide group, an acetamide group), an imide group (preferably an imide group having from 4 to 22 carbon atoms, more preferably from 4 to 12 carbon atoms, even more preferably from 4 to 8 carbon atoms, for example, a succinimide group, a phthalimide group), an aryl-alkyl group (preferably an aryl group having from 7 to 25 carbon atoms, more preferably from 7 to 19 carbon atoms, even more preferably from 7 to 13 carbon atoms, for example, a benzyl group). Of those, more preferred are an alkyl group and an acyl group; and even more preferred are a methyl group, an acetyl group, a benzoyl group and a benzyl group; and especially preferred are an acetyl group and a benzyl group. Especially of those, in case where the constitutive sugar in the sugar ester compound is a sucrose skeleton, preferred are sugar ester compounds having an acetyl group and a benzyl group as the substituents therein, as compared with the sugar ester compound with a benzoyl group described as the compound 3 in [0058] in JP-A 2009-

1696 and used in Examples in the patent reference, in point of the compatibility thereof with polymer.

Preferably, the number of the hydroxyl groups per the structural unit in the sugar ester compound (hereinafter this may be referred to as a hydroxyl group content) is at most 3, more preferably at most 1, even more preferably zero (0). Controlling the hydroxyl group content to fall within the range is preferred since the sugar ester compound may be prevented from moving into the adjacent polarizing element layer to break the PVA-iodine complex therein while aged under high temperature and high humidity condition, and therefore the polarizing element performance may be prevented from worsening in aging under high temperature and high humidity condition.

Preferably, in the sugar ester compound for use in the film of the invention, an unsubstituted hydroxyl group does not exist and the substituents therein are an acetyl group and/or a benzyl group alone.

Regarding the proportion of the acetyl group and the benzyl group in the sugar ester compound, preferably, the proportion of the benzyl group is smaller in some degree. This is because the wavelength dispersion characteristics of retardation of the cellulose acylate film of the type, ΔRe and ΔRe/Re(500) may increase and, when the film is incorporated in a liquid crystal display device, the color shift at the time of black state could be small. Concretely, the ratio of the benzyl group to the sum total of all the unsubstituted hydroxyl groups and all the substituents in the sugar ester compound is preferably at most 60%, more preferably at most 40%.

The sugar ester compounds are available as commercial products such as Tokyo Chemical's Aldrich, etc., or may be produced according to known methods of converting commercially-available hydrocarbons into ester derivatives thereof (for example, according to the method described in JP-A8-245678).

Preferably, the sugar ester compound has a number-average molecular weight of from 200 to 3500, more preferably from 200 to 3000, even more preferably from 250 to 2000.

Specific examples of the sugar ester compounds preferred for use in the invention are mentioned below; however, the invention is not limited to the following embodiments.

In the structural formulae mentioned below, R each independently represents an arbitrary substituent, and plural R's may be the same or different.

TABLE 3

| Compound | Substituent 1 type | Substituent 1 degree of substitution | Substituent 2 type | Substituent 2 degree of substitution | Molecular Weight |
|---|---|---|---|---|---|
| 100 | acetyl | 8 | benzyl | 0 | 679 |
| 101 | acetyl | 7 | benzyl | 1 | 727 |
| 102 | acetyl | 6 | benzyl | 2 | 775 |
| 103 | acetyl | 5 | benzyl | 3 | 817 |
| 104 | acetyl | 0 | benzyl | 8 | 1063 |
| 105 | acetyl | 7 | benzoyl | 1 | 741 |
| 106 | acetyl | 6 | benzoyl | 2 | 802 |
| 107 | benzyl | 2 | no | 0 | 523 |
| 108 | benzyl | 3 | no | 0 | 613 |

TABLE 3-continued

| Compound | Substituent 1 type | Substituent 1 degree of substitution | Substituent 2 type | Substituent 2 degree of substitution | Molecular Weight |
|---|---|---|---|---|---|
| 109 | benzyl | 4 | no | 0 | 702 |
| 110 | acetyl | 7 | phenylacetyl | 1 | 771 |
| 111 | acetyl | 6 | phenylacetyl | 2 | 847 |

TABLE 4

| Compound | Substituent 1 type | Substituent 1 degree of substitution | Substituent 2 type | Substituent 2 degree of substitution | Molecular Weight |
|---|---|---|---|---|---|
| 201 | acetyl | 4 | benzoyl | 1 | 468 |
| 202 | acetyl | 3 | benzoyl | 2 | 514 |
| 203 | acetyl | 2 | benzoyl | 3 | 577 |
| 204 | acetyl | 4 | benzyl | 1 | 454 |
| 205 | acetyl | 3 | benzyl | 2 | 489 |
| 206 | acetyl | 2 | benzyl | 3 | 535 |
| 207 | acetyl | 4 | phenylacetyl | 1 | 466 |
| 208 | acetyl | 3 | phenylacetyl | 2 | 543 |
| 209 | acetyl | 2 | phenylacetyl | 3 | 619 |
| 210 | phenylacetyl | 1 | no | 0 | 298 |
| 211 | phenylacetyl | 2 | no | 0 | 416 |
| 212 | phenylacetyl | 3 | no | 0 | 535 |
| 213 | phenylacetyl | 4 | no | 0 | 654 |

TABLE 5

| Compound | Substituent 1 type | Substituent 1 degree of substitution | Substituent 2 type | Substituent 2 degree of substitution | Molecular Weight |
|---|---|---|---|---|---|
| 301 | acetyl | 6 | benzoyl | 2 | 803 |
| 302 | acetyl | 6 | benzyl | 2 | 775 |
| 303 | acetyl | 6 | phenylacetyl | 2 | 831 |
| 304 | benzoyl | 2 | no | 0 | 551 |
| 305 | benzyl | 2 | no | 0 | 522 |
| 306 | phenylacetyl | 2 | no | 0 | 579 |

TABLE 6

[Structure: disaccharide with CH₂OR, OR substituents]

| Compound | Substituent 1 type | degree of substitution | Substituent 2 type | degree of substitution | Molecular Weight |
|---|---|---|---|---|---|
| 401 | acetyl | 6 | benzoyl | 2 | 803 |
| 402 | acetyl | 6 | benzyl | 2 | 775 |
| 403 | acetyl | 6 | phenylacetyl | 2 | 831 |
| 404 | benzoyl | 2 | no | 0 | 551 |
| 405 | benzyl | 2 | no | 0 | 523 |
| 406 | phenyl ester | 2 | no | 0 | 579 |

The sugar ester compound is preferably contained in an amount of 2 to 30 mass %, more preferably 5 to 20 mass %, and further preferably 5 to 15 mass % relative to the primary component content (e.g., cellulose acylate) of the film.

In case where the film contains the after-mentioned additive having a negative intrinsic birefringence along with the sugar ester compound, the amount of the sugar ester compound (part by mass) relative to the amount of the additive having a negative intrinsic birefringence (part by mass) is preferably from 2 to 10 times (ratio by mass), more preferably from 3 to 8 times (ratio by mass).

In case where the film contains the after-mentioned polyester-type plasticizer along with the sugar ester compound, the amount of the sugar ester compound (part by mass) relative to the amount of the polyester-type plasticizer (part by mass) is preferably from 2 to 10 times (ratio by mass), more preferably from 3 to 8 times (ratio by mass).

One or more different types of sugar ester compounds mentioned above may be used in the film of the invention either singly or as combined therein.

In addition, low-molecular-weight additives may be contained in the B layer. Examples of the low-molecular-weight additives include retardation reducers or adjusters, antioxidants, ultraviolet absorbers, releasing agents, plasticizers, and infrared absorbers. These additives may be in the form of solid or oil. In other words, the additives are not specifically limited in terms of their melting points or boiling points. For example, a mixture of ultraviolet absorbers having melting points of 20° C. or lower and 20° C. or higher may be used, and a mixture of antioxidants may also be used. Examples of infrared absorbing dyes include those disclosed in JP-A-2001-194522.

Examples of the low-molecular-weight additives include retardation enhancers. Addition of retardation enhancers enables a film to exhibit high Re at a low stretching rate. Examples of the usable retardation enhancers include, but are not limited to, rod-like or discotic compounds. Among the rod-like or discotic compounds, compounds having at least two aromatic rings are preferably used as the retardation enhancers. The rod-like compound as the retardation enhancer is preferably contained in an amount of 0.5 to 10 parts by weight, more preferably 2 to 6 parts by weight relative to 100 parts by weight of the polymer component containing cellulose acylate. The discotic compound as the retardation enhancer is preferably contained in an amount of 0.5 to 10 parts by weight, more preferably 1 to 8 parts by weight, and further preferably 2 to 6 parts by weight relative to 100 parts by weight of the polymer component containing cellulose acylate. Two or more retardation enhancers may be used in combination. The retardation enhancer preferably exhibits maximum absorption in a wavelength region ranging from 250 to 400 nm and more preferably exhibits substantially no absorption in a visible region.

Triazine compounds represented by Formula (I) are preferably used as the discotic compounds.

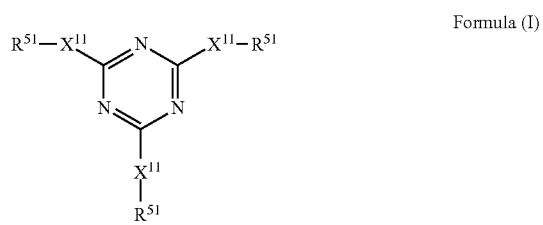

Formula (I)

In Formula 1, $R^{51}$'s independently represent an aromatic ring or a heterocyclic ring having a substituent at any of its ortho-, meta- and para-positions.

$X^{11}$'s independently represent a single bond or $-NR^{52}-$. $R^{52}$'s independently represent a hydrogen atom or a substituted or unsubstituted alkyl, alkenyl, aryl, or heterocyclic group.

The aromatic ring represented by $R^{51}$ is preferably a phenyl ring or a naphtyl ring, and more preferably a phenyl ring. The aromatic ring represented by $R^{51}$ may have at least one substituent in any one of the sites of substitution. Examples of the substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfoneamide group, a carbamoyl group, an alkyl-substituted carbamoyl group, an alkenyl-substituted carbamoyl group, an aryl-substituted carbamoyl group, an amide group, an alkylthio group, an alkenylthio group, an arylthio group, and an acyl group.

The heterocyclic ring represented by $R^{51}$ is preferably aromatic. The aromatic heterocyclic ring is generally an unsaturated heterocyclic ring and is preferably a heterocyclic ring having maximum double bonds. The heterocyclic ring is preferably a five-membered, six-membered, or seven-membered ring, more preferably a five-membered or six-membered ring, and most preferably a six-membered ring. The hetero atom constituting the heterocyclic ring is preferably a nitrogen atom, a sulfur atom, or an oxygen atom, more preferably a nitrogen atom.

An especially preferred aromatic heterocyclic ring is a pyridine ring (containing a 2-pyridyl or 4-pyridyl group as a heterocyclic group). The heterocyclic group may have a substituent. Examples of the substituent of the heterocyclic group are the same as those mentioned for the substituent of the aromatic ring.

The heterocyclic group preferably has a free valence at the nitrogen atom in the case where $X^{11}$ represents a single bond. The heterocyclic group having a free valence at the nitrogen atom is preferably a five-membered, six-membered, or seven-membered ring, more preferably a five-membered or six-membered ring, and most preferably a five-membered ring. The heterocyclic group may have multiple nitrogen atoms. The heterocyclic group may have any other hetero atom (e.g., an oxygen or sulfur atom) than the nitrogen atom. Examples of the heterocyclic group having a free valence at the nitrogen atom are shown below:

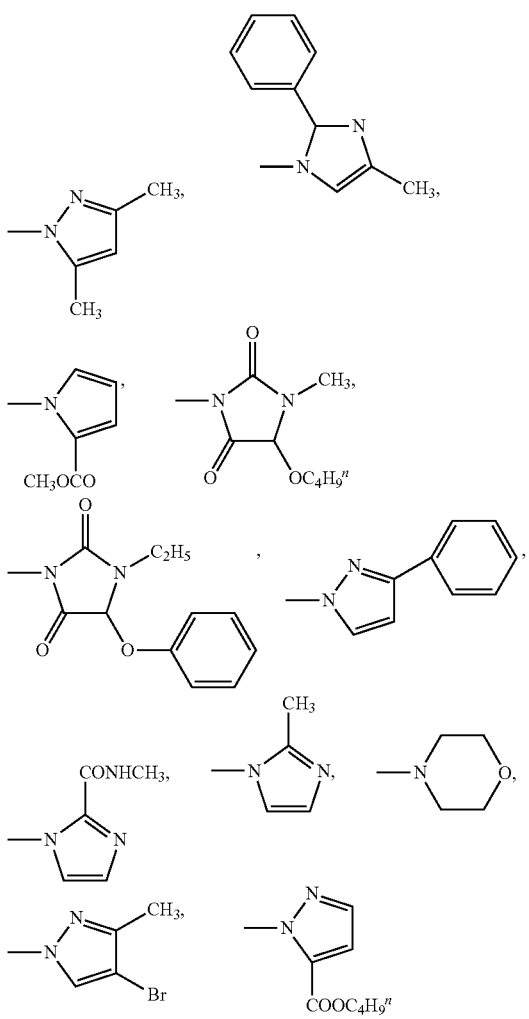

The alkyl group represented by $R^{52}$ may be a cyclic alkyl group or a chain alkyl group, and preferred is a chain alkyl group; straight chain alkyl group is more preferred to a branched chain alkyl group. The alkyl group preferably has 1 to 30 carbon atoms, more preferably 1 to 20, further preferably 1 to 10, still further preferably 1 to 8, and even further preferably 1 to 6. The alkyl group may have a substituent. Example of the substituent include halogen atoms, alkoxy groups (e.g., a methoxy group and an ethoxy group), and acyloxy groups (e.g., an acryloxy group and a methacryloxy group).

The alkenyl group represented by $R^{52}$ may be a cyclic alkenyl group or a chain alkenyl group, and preferred is a chain alkenyl group; a straight chain alkenyl group is preferred to a branched chain alkyl group. The alkenyl group preferably has 2 to 30 carbon atoms, more preferably 2 to 20, further preferably 2 to 10, still further preferably 2 to 8, and most preferably 2 to 6. The alkenyl group may have a substituent. Examples of the substituent are the same as those of the alkyl group described above.

The aromatic ring group and heterocyclic group represented by $R^{52}$ and their preferred examples are the same as those described for $R^{51}$. The aromatic ring group and the heterocyclic group may further have a substituent, and examples of the substituent are the same as those of the aromatic ring group and the heterocyclic group represented by $R^{51}$.

The B layer may be a film and is preferably a cellulose acylate film primarily composed of cellulose acylate. The film may be produced by any process, for example, a solvent casting process or a melt casting process. The cellulose acylate having a low degree of acylation is preferred in terms of optical characteristics; however, it exhibits unsatisfactory film formability as compared to cellulose acylate having a high degree of acylation in some cases. For instance, unsuccessful separation of the film from a supporting drum or a belt on which cellulose acylate has been casted may occur in a solvent casting process. In order to prevent such a problem, the B layer may be formed by co-casting of a cellulose acylate solution having a low degree of acylation and a cellulose acylate solution having a high degree of acylation (e.g., 2.75 or higher) as dopes for formation of a core layer and formation of a skin layer on one or two sides of the core layer, respectively. In the case where the film formed by the co-casting of the two dopes has a core layer which has a thickness significantly larger than that of a skin layer and accounts for a large portion of the B layer, the cellulose acylate having a low degree of acylation is the main component of the B layer.

The B layer which is in the form of a film may be subjected to adjustment of optical characteristics, such as stretching and contraction, to satisfy the above optical characteristics. The stretching may be uniaxial stretching in one direction [for example, machine direction (MD) or transverse direction (TD)] or biaxial stretching in two directions (for example, MD and TD).

Examples of the B layer include a film primarily composed of cellulose acetate having a total degree of acylation of 2.2 to 2.5 and optionally containing the high-molecular-weight additive described above, the film being formed by a solvent casting process and then uniaxially and/or biaxially stretched at a temperature ranging from 170 to 200° C. and a stretching rate of 40 to 80% so as to have a thickness of 25 to 80 µm. Cellulose acetate with the total degree of acylation of 2.2 to 2.5 has an SP value of approximately 22.9 to 23.9.

C layer

The C layer is a negative C-plate satisfying the following formulae (Ic) and (IIc):

$$Re(550) \leq 10 \text{ nm; and} \qquad \text{(Ic):}$$

$$-200 \text{ nm} \leq Rth(550) \leq -50 \text{ nm}, \qquad \text{(IIc):}$$

In terms of improvements in viewing angle characteristics of liquid crystal displays of horizontal-alignment modes, the C layer preferably satisfies the following two formulae:

$$-8 \leq Re(550) \leq 8 \text{ nm; and} \qquad \text{(Ic'):}$$

$$-160 \text{ nm} \leq Rth(550) \leq -55 \text{ nm}, \qquad \text{(IIc'):}$$

more preferably satisfies the following two formulae:

$$-6 \leq Re(550) \leq 6 \text{ nm; and} \qquad \text{(Ic''):}$$

$$-150 \text{ nm} \leq Rth(550) \leq -60 \text{ nm}. \qquad \text{(IIc''):}$$

Examples of the layers satisfying the above optical characteristics include layers primarily composed of non-liquid crystal organic polymers and layers in which molecules of rod-like liquid crystal being the primary component are fixed in a homeotropic alignment.

The non-liquid crystal organic polymer being the primary component of the C layer is preferably selected from non-liquid crystal organic polymers exhibiting negative intrinsic birefringence. Examples of the non-liquid crystal organic polymers exhibiting negative intrinsic birefringence include fumarate resins, polystyrene derivatives, and styrene copolymers. These polymers will now be described.

Examples of the fumarate resins used as the primary components of the C layer include fumarate polymers, and, in particular, preferred are fumaric acid diester resins containing fumaric acid diester moieties (50 mol % or higher) represented by Formula (a).

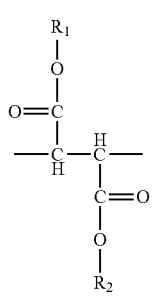

(a)

$R_1$ and $R_2$ each independently represent a branched alkyl group or a cyclic alkyl group having 3 to 12 carbon atoms.

Ester substituents $R_1$ and $R_2$ of the fumaric acid diester moieties each independently represent a branched alkyl or cyclic alkyl group having 3 to 12 carbon atoms, which may be substituted with a halogen group, such as a fluorine atom or a chlorine atom; an ether group; an ester group; or an amino group. Examples of ester substituents $R_1$ and $R_2$ include an isopropyl group, a s-butyl group, a t-butyl group, a s-pentyl group, a t-pentyl group, a s-hexyl group, a t-hexyl group, a cyclopropyl group, a cyclopentyl group, and a cyclohexyl group. Preferred are an isopropyl group, a s-butyl group, a t-butyl group, a cyclopentyl group, and a cyclohexyl group, and more preferred is an isopropyl group.

Examples of the fumaric acid diester moieties represented by Formula (a) include a diisopropyl fumarate moiety, a di-s-butyl fumarate moiety, a di-t-butyl fumarate moiety, a di-s-pentyl fumarate moiety, a di-t-pentyl fumarate moiety, a di-s-hexyl fumarate moiety, a di-t-hexyl fumarate moiety, a dicyclopropyl fumarate moiety, a dicyclopentyl fumarate moiety, and a dicyclohexyl fumarate moiety. Preferred are a diisopropyl fumarate moiety, a di-s-butyl fumarate moiety, a di-t-butyl fumarate moiety, a dicyclopentyl fumarate moiety, and a dicyclohexyl fumarate moiety, and more preferred is a diisopropyl fumarate moiety.

Preferred examples of the primary component of the C layer include fumarate resins composed of 50 mol % or more of fumaric acid diester moieties represented by Formula (a), more preferably resins composed of 50 mol % or more of fumaric acid diester moieties represented by Formula (a) and 50 mol % or less of moieties as monomers copolymerizable with fumaric acid diesters. Examples of the moieties as the monomers copolymerizable with the fumaric acid diesters include one or more of styrenic moieties such as a styrene moiety and an α-methylstyrene moiety; an acrylic acid moiety; acrylic acid ester moieties such as a methyl acrylate moiety, an ethyl acrylate moiety, a butyl acrylate moiety, an (3-ethyloxetane-3-yl)methyl acrylate ester moiety, and a tetrahydrofurfuryl acrylate; a methacrylic acid moiety; methacrylic acid ester moieties such as a methyl methacylate moiety, an ethyl methacrylate moiety, a butyl methacrylate moiety, a (3-ethyloxetane-3-yl)methyl methacrylate ester moiety, and a tetrahydrofurfuryl methacrylate; a vinyl ester moieties such as a vinyl acetate moiety and a vinyl propionate moiety; an acrylonitrile moiety; a methacrylonitrile moiety; and an olefin moieties such as an ethylene moiety and a propylene moiety. Among these, preferred are an (3-ethyloxetane-3-yl)methyl acrylate ester moiety and a (3-ethyloxetane-3-yl)methyl methacrylate ester moiety, and more preferred is an acid(3-ethyloxetane-3-yl)methyl acrylate ester moiety. In particular, preferred are resins composed of 70 mol % or more of the fumaric acid diester moieties represented by Formula (a), more preferred are resins composed of 80 mol % or more of the fumaric acid diester moieties, and more preferred are resins composed of 90 mol % or more of the fumaric acid diester moieties. Resins composed of the fumaric acid diester moieties represented by Formula (a) alone are obviously preferred.

The fumarate resin as the primary component of the C layer preferably has a number average molecular weight (Mn) of $1 \times 10^4$ or higher, preferably from $2 \times 10^4$ to $2 \times 10^5$ in terms of production of an optical compensation film having excellent mechanical properties and exhibiting high moldability at film formation, the number average molecular weight being obtained from an elution curve determined by gel permeation chromatography (hereinafter referred to as GPC) and converted by standard polystyrene.

The fumarate resins can be produced by a variety of processes without limitation. For example, the fumarate resins can be produced by radical polymerization or copolymerization of fumaric acid diesters, optionally in combination with monomers copolymerizable with the fumaric acid diesters. Example of the fumaric acid diesters used for synthesis of the fumarate resins include diisopropyl fumarate, di-s-butyl fumarate, di-t-butyl fumarate, di-s-pentyl fumarate, di-t-pentyl fumarate, di-s-hexyl fumarate, di-t-hexyl fumarate, dicyclopropyl fumarate, dicyclopentyl fumarate, and dicyclohexyl fumarate. Examples of the monomers copolymerizable with the fumaric acid diesters include one or more of styrenes such as styrene and α-methylstyrene; acrylic acid; acrylic acid esters such as methyl acrylate, ethyl acrylate, butyl acrylate, (3-ethyloxetane-3-yl)methyl acrylate ester, and tetrahydrofurfuryl acrylate; methacrylic acid; methacrylic acid esters such as methyl methacylate, ethyl methacrylate, butyl methacrylate, (3-ethyloxetane-3-yl)methyl methacrylate ester, and tetrahydrofurfuryl methacrylate; vinyl esters such as vinyl acetate and vinyl propionate; acrylonitrile; methacrylonitrile; and olefins such as ethylene and propylene. Among these, preferred are (3-ethyloxetane-3-yl)methyl acrylate ester and (3-ethyloxetane-3-yl)methyl methacrylate ester, and more preferred is (3-ethyloxetane-3-yl)methyl acrylate ester.

Traditional polymerization methods can be used for the radical polymerization. Examples of usable polymerization methods include bulk polymerization, solution polymerization, suspension polymerization, precipitation polymerization, and emulsion polymerization.

Examples of a polymerization initiator for the radical polymerization include organic peroxides such as benzoyl peroxide, lauryl peroxide, octanoyl peroxide, acetyl peroxide, di-t-butyl peroxide, t-butylcumyl peroxide, dicumyl peroxide, t-butyl peroxiacetate, t-butyl peroxibenzoate, and t-butyl peroxypivalate; and azo initiators such as 2,2'-azobis(2,4-dimethylvaleronitrile), 2,2'-azobis(2-butyronitrile), 2,2'-azobis(isobutyronitrile), dimethyl-2,2'-azobisisobutyrate, and 1,1'-azobis(cyclohexane-1-carbonitrile).

Any solvent can be used in solution polymerization, suspension polymerization, precipitation polymerization, and emulsion polymerization, and examples of the usable solvent include aromatic solvents such as benzene, toluene, and xylene; alcohols such as methanol, ethanol, propyl alcohol, and butyl alcohol; cyclohexane; dioxane; tetrahydrofuran (THF); acetone; methyl ethyl ketone; dimethylformamide; isopropyl acetate; water; and mixtures thereof.

The polymerization temperature for the radical polymerization can be appropriately determined depending on the decomposition temperature of the polymerization initiator and is preferably in the range of 40 to 150° C. in general.

Examples of the other non-liquid crystal organic polymers usable as the primary component of the C layer include polymers and copolymers of monomers of which homopolymers have negative birefringence. Examples of such monomers include acrylic monomers, aromatic monomers such as cellulose benzoate monomers and styrene monomers, and ethylenically unsaturated monomers. In particular, preferred are acrylic monomers, styrenic monomers, and vinylpyrrolidone monomers; more preferred are styrenic monomers and vinylpyrrolidone; and most preferred are styrenic monomers.

Preferred examples of the non-liquid crystal organic polymers usable as the primary component of the C layer include polystyrene derivatives and styrene copolymers. Specifically, such compounds include homopolymers and copolymers of styrene monomers. The styrene copolymers may be copolymers of two or more styrene monomers or may be copolymers of at least one styrene monomer with at least one non-styrene monomer [for example, acrylic monomers represented by the Formula (c)].

Examples of the styrene monomers include monomers synthesized by substituting at least one hydrogen atom of an ethenyl group of styrene with a substituent and monomers synthesized by substituting at least one hydrogen atom of a phenyl group of styrene with a substituent. Preferred are styrene monomers having a substituent at a phenyl group. Examples of the substituent include an alkyl group, a halogen atom, an alkoxy group, a carboxyl group such as an acetoxy group, an amino group, a nitro group, a cyano group, an aryl group, a hydroxyl group, and a carbonyl group. Preferred are a hydroxyl group, a carbonyl group, and an acetoxy group, and more preferred are a hydroxyl group and an acetoxy group. These substituents may be used alone or in combination. The substituents may or may not have another substituent. The styrene monomers may be synthesized by condensation of the phenyl group with any other aromatic ring, may be in the form of indenes or indanes where the substituent forms any other ring than the phenyl group, or may have a cross-linked structure.

The styrene monomers are preferably aromatic vinyl monomers represented by Formula (b):

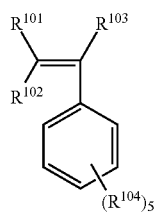

Formula (b)

In Formula (b), $R^{101}$ to $R^{104}$ each independently represent a substituted or unsubstituted hydrocarbon group having 1 to 30 carbon atoms or a polar group, the substituted or unsubstituted hydrocarbon group optionally having a linking group containing a hydrogen atom, a halogen atom, an oxygen atom, a sulfur atom, a nitrogen atom, or a silicon atom. $R^{104}$'s may be the same atoms or groups, may be different atoms or groups, or may be bonded to each other to form a carbon ring or a heterocyclic ring (the carbon ring or the heterocyclic ring may have a monocyclic structure or may have a polycyclic structure condensed with any other ring).

Specific examples of the aromatic vinyl monomers include, but are not limited to, styrene; alkyl-substituted styrenes such as α-methylstyrene, β-methylstyrene, and p-methylstyrene; halogen-substituted styrenes such as 4-chlorostyrene and 4-bromostyrene; hydroxystyrenes such as p-hydroxystyrene, α-methyl-p-hydroxystyrene, 2-methyl-4-hydroxystyrene, and 3,4-dihydroxystyrene; vinylbenzyl alcohols; alkoxy-substituted styrenes such as p-methoxystyrene, p-tert-butoxystyrene, and m-tert-butoxystyrene; vinylbenzoic acids such as 3-vinylbenzoic acid and 4-vinylbenzoic acid; vinylbenzoates such as methyl 4-vinylbenzoate and ethyl 4-vinylbenzoate; 4-vinylbenzyl acetate; 4-acetoxystyrene; amidestyrenes such as 2-butylamide styrene, 4-methylamide styrene, and p-sulfonamide styrene; aminostyrenes such as 3-aminostyrene, 4-aminostyrene, 2-isopropenylaniline, and vinylbenzyldimethylamine; nitrostyrenes such as 3-nitrostyrene and 4-nitrostyrene; cyanostyrenes such as 3-cyanostyrene and 4-cyanostyrene; vinylphenylacetonitrile; arylstyrenes such as phenylstyrene; and indenes. Two or more of these monomers may be used for copolymerization.

The acrylic monomers can be selected from monomers, for example, represented by Formula (c):

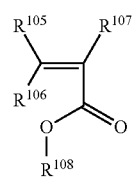

Formula (c)

wherein $R^{105}$ to $R^{108}$ each independently represent a hydrogen atom; a halogen atom; a substituted or unsubstituted hydrocarbon group having from 1 to 30 carbon atoms optionally having a linking group containing an oxygen atom, a sulfur atom, a nitrogen atom or a silicon atom; or a polar group.

Examples of the acrylate monomers include, for example, methyl acrylate, ethyl acrylate, (i-, n-)propyl acrylate, (n-, i-, s-tert-)butyl acrylate, (n-, i-, s-)pentyl acrylate, (n-, i-)hexyl acrylate, (n-, i-)heptyl acrylate, (n-, i-)octyl acrylate, (n-, i-)nonyl acrylate, (n-, i-) myristyl acrylate, (2-ethylhexyl) acrylate, (ε-caprolactone) acrylate, (2-hydroxyethyl)acrylate, (2-hydroxypropyl)acrylate, (3-hydroxypropyl)acrylate, (4-hydroxybutyl)acrylate, (2-hydroxybutyl)acrylate, (2-methoxyethyl)acrylate, (2-ethoxyethyl)acrylate, phenyl acrylate, phenyl methacrylate, (2 or 4-chlorophenyl) acrylate, (2 or 4-chlorophenyl)methacrylate, (2 or 3 or 4-ethoxycarbonylphenyl)acrylate, (2 or 3 or 4-ethoxycarbonylphenyl)methacrylate, (o or m or p-tolyl) acrylate, (o or m or p-tolyl) methacrylate, benzyl acrylate, benzyl methacrylate, phenethyl acrylate, phenethyl methacrylate, (2-naphthyl) acrylate, cyclohexyl acrylate, cyclohexyl methacrylate, (4-methylcyclohexyl)acrylate, (4-methylcyclohexyl)methacrylate, (4-ethylcyclohexyl) acrylate, (4-ethylcyclohexyl) methacrylate, and methacrylates corresponding to the above-mentioned acrylates. However, the invention should not be limited to these examples. Two or more such monomers may be copolymerized into copolymers for use herein. Of those, preferred are methyl acrylate, ethyl acrylate, (i-, n-) propyl acrylate, (n-, i-, s-, tert-)butyl acrylate, (n-, i-, s-)pentyl acrylate, (n-,i-)hexyl acrylate, and methacrylates corresponding to these acrylates, from the viewpoint that they are easily available industrially and are inexpensive.

Preferably, the C layer is primarily composed of homopolymers or copolymers having a repeating unit derived from monomers of which homopolymers have negative birefringence. Examples of such monomers include styrene; alkyl-substituted styrenes such as α-methylstyrene, β-methylstyrene, and p-methylstyrene; halogen-substituted styrenes such as 4-chlorostyrene and 4-bromostyrene; hydroxystyrenes such as p-hydroxystyrene, α-methyl-p-hydroxystyrene, 2-methyl-4-hydroxystyrene, and 3,4-dihydroxystyrene; vinylbenzyl alcohols; alkoxy-substituted styrenes such as p-methoxystyrene, p-tert-butoxystyrene, and m-tert-butoxystyrene; vinylbenzoic acids such as 3-vinylbenzoic acid and 4-vinylbenzoic acid; vinylbenzoates such as methyl 4-vinylbenzoate and ethyl 4-vinylbenzoate; 4-vinylbenzyl acetate; 4-acetoxystyrene; amidestyrenes such as 2-butylamide styrene, 4-methylamide styrene, and p-sulfonamide styrene; aminostyrenes such as 3-aminostyrene, 4-aminostyrene, 2-isopropenyl aniline, and vinylbenzyl dimethylamine; nitrostyrenes such as 3-nitrostyrene and 4-nitrostyrene; cyanostyrenes such as 3-cyanostyrene and 4-cyanostyrene; vinylphenylacetonitrile; arylstyrenes such as phenylstyrene; indenes; and vinylpyrrolidone. Among these, preferred are styrene, hydroxystyrene, acetoxystyrene, and vinylpyrrolidone; and more preferred are styrene, m-hydroxystyrene, o-hydroxystyrene, m-acetoxystyrene, o-acetoxystyrene, and vinylpyrrolidone.

One or more surfactants may be added to the C layer primarily composed of the non-liquid crystal organic polymer. JP-A-2009-168900 discloses examples of usable additives and preferred additive content in the paragraphs to.

The fumarate resins, the polystyrene derivatives, and the styrene copolymers, which have been described as examples of the non-liquid crystal organic polymers, each have an SP value of approximately 17 to 20.5. The primary component of the C layer can be selected from these non-liquid crystal organic polymers and used in combination with the primary component of the B layer, such as cellulose acylate having the total degree of acyl substitution of 2.2 to 2.5, so as to provide a |ΔSP value| of 1.5 or lower.

The form of the C layer primarily composed of the non-liquid crystal organic polymers are not specifically limited. The C layer may be self-supporting films primarily composed of the non-liquid crystal organic polymers or may be non-self-supporting layers formed by, for instance, coating of a composition primarily composed of the non-liquid crystal organic polymers. The former may be films formed by a solvent casting process or a melt casting process. The latter may be an embodiment in which the B layer functions as a self-supporting film and the C layer functions as a non-self-supporting film.

For example, the C layer is formed by coating a surface of the B layer as a film with a coating liquid primarily composed of an organic polymer and then drying the coat. Any solvent can be used for preparation of the coating liquid, and the solvent can be selected depending on the solubility or other characteristics of its primary component. Examples of the solvent include ketones such as methyl ethyl ketone (MEK), acetone, methyl isobutyl ketone, methyl isopropyl ketone, and cyclohexanone; esters such as ethyl acetate, butyl acetate, ethyl lactate, γ-butyrolactone, propylene glycol monomethyl ether acetate, and propylene glycol monoethyl ether acetate; ethers such as ethylene glycol monomethyl ether and diethylene glycol monobutyl ether; aromatic hydrocarbons such as benzene, toluene, and xylene; amides such as dimethylformamide, dimethylacetamide, and N-methylpyrrolidone. These solvents may be used in combination.

Furthermore, any coating method can be used. Various coating methods may be used, such as spin coating, dip coating, curtain coating, extrusion coating, rod coating, and roll coating.

Another embodiment of the C layer is a layer in which molecules of rod-like liquid crystal being the primary component are fixed in a homeotropic alignment. The layer in which molecules of rod-like liquid crystal are fixed in a homeotropic alignment functions as a negative C-plate and exhibits optical characteristics essential for the C layer. The primary component of such a layer is low-molecular-weight rod-like liquid crystal in the case where the rod-like liquid crystal is contained in its original state or is high-molecular-weight rod-like liquid crystal in the case where polymerizable rod-like liquid crystal contained is polymerized to have high molecular weight, and an SP value is determined for each case. In general, rod-like liquid crystal has an SP value of 20 to 25. The primary component of the C layer can be selected from these types of rod-like liquid crystal and used in combination with the primary component of the B layer, such as cellulose acylate having a total degree of acyl substitution of approximately 2.2 to 2.5, so as to provide a |ΔSP value| of 1.5 or lower.

For example, JP-A-2009-217256 discloses usable rod-like liquid crystal in paragraphs to. Furthermore, for instance, JP-A-2009-237421 discloses usable additives, usable alignment films, and a method for forming the homeotropic liquid crystal layer in paragraphs to.

The thickness of the C layer is not specifically limited. In general, the C layer formed by coating has a thickness of approximately 0.5 to 20 μm (preferably 1.0 to 15 μm). In the case where the C layer is in the form of a film, the C layer has a thickness approximately the same as that of the B layer.

Laminated Optical Film

The laminated optical film of the present invention may have any characteristic and can be produced by any process, provided that the laminated optical film includes the B and C layers which satisfy the above-mentioned optical characteristics. The B and C layers may be integrated with each other by any process such as coating, co-casting, or lamination using adhesive agents or other materials.

In an embodiment where the B layers adjoins the C layer, their compatibility is enhanced at the interface therebetween; hence, the present invention is effective for such an embodiment. In an especially preferred embodiment, at least any one of the B and C layers, more preferably the C layer, is formed by coating, which enhances the compatibility between the B and C layers.

The thickness of the laminated optical film is not specifically limited, whereas optical films used in liquid crystal displays generally have a thickness of 30 to 100 μm. The laminated optical film preferably has a thickness of 80 μm or lower, more preferably 30 to 70 μm in view of demands for a reduction in thickness. For example, the C layer is formed on a surface of a film as the B layer by coating, which can omit the adhesive layer, leading to a reduction in the thickness of the laminated optical film. Commonly, when the adhesive layer is omitted, thickness of 5 to 20 μm of the adhesive layer is not needed. Therefore, it can make the laminated optical film thinner, or adjust thickness of the each layer.

Provided is high functionality optical film which admits of function design but thin layer because it can provide range of adjusting of optical property, and optimization of adequacy of manufacturing or adequacy of production of handling and flatness, when it can adjust thickness of the each layer. A thin cellulose acylate film having a total degree of acylation of 2.2 to 2.5 is preferably used as the B layer, so that its function to develop high optical characteristics imparts essential optical characteristics to the B layer regardless of a thickness while the thickness of the laminated optical film can be further decreased.

2. Polarizing Plate

The present invention also relates to a polarizing plate including the laminated optical film of the present invention and a polarizer. The laminated optical film of the present invention may function as a protective film of the polarizer. Traditionally known polarizers may be used, for instance, a polarizer produced by stretching a hydrophilic polymer film (e.g., a polyvinyl alcohol film) after being treated with a dichroic dye such as iodine. The cellulose acylate film may be integrated with the polarizer in any manner; for example, an aqueous solution of a water-soluble polymer may be used as an adhesive agent for the integration. A preferred water-soluble polymer adhesive agent is an aqueous solution of completely-saponified polyvinyl alcohol.

Figure 2:
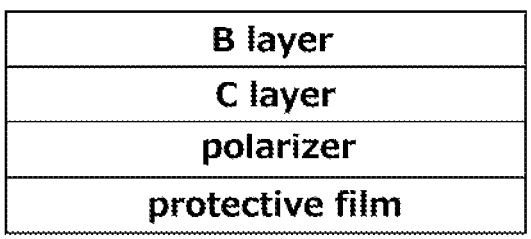
FIG. 2 is a schematic cross-sectional view illustrating a polarizing plate of another embodiment of the present invention.

In the polarizing plate of the present invention, a relative position of the B and C layers to the polarizer is not specifically limited. For instance, the polarizing plate may be a lamination of the C layer, the B layer, and the polarizer as illustrated in FIG. 1 or a lamination of the B layer, the C layer, and the polarizer as illustrated in FIG. 2. The former is suitable for polarizing plates of an IPS mode while the latter is suitable for polarizing plates of an FFS mode, among horizontal-alignment modes.

As illustrated in FIGS. 1 and 2, preferably a protect film is bonded to the other surface of the polarizer, the other surface being not bonded to the laminated optical film of the present invention. Various polymer films can be used, such as films of cellulose acylate, cyclic olefin polymer, polycarbonate, polysulfone, polyether sulfone, polyacrylate, and polymethacrylate.

3. Liquid Crystal Display of Horizontal-Alignment Mode

The present invention also relates to liquid crystal displays of horizontal-alignment modes including the laminated optical film of the present invention. The horizontal-alignment modes include IPS modes and FFS modes.

The laminated optical film of the present invention is preferably disposed as an optical compensation film between a liquid crystal cell and a polarizer, more preferably disposed between a viewing-side polarizer and the liquid crystal cell or between a back-light-side polarizer and the liquid crystal cell. The laminated optical film of the present invention may be integrated with a polarizer and incorporated as part of the polarizing plate into a liquid crystal display.

Figure 3:
FIG. 3 is a schematic cross-sectional view illustrating a liquid crystal display of an embodiment of the present invention.
Figure 3:
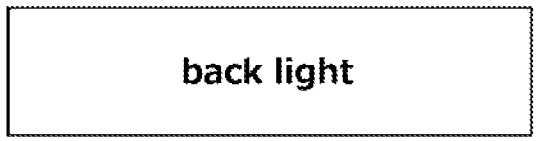
Figure 4:
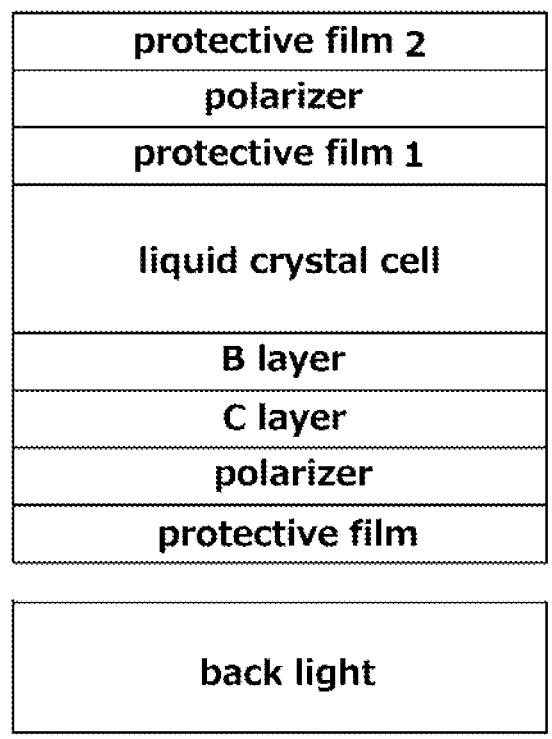
FIG. 4 is a schematic cross-sectional view illustrating a liquid crystal display of another embodiment of the present invention.

FIGS. 3 and 4 are schematic cross-sectional views each illustrating a liquid crystal display of an embodiment of the present invention. FIG. 3 illustrates an embodiment of an IPS mode, and FIG. 4 illustrates an embodiment of an FFS mode. The relative thicknesses of individual layers in FIGS. 3 and 4 do not always reflect the relative thicknesses of individual layers of actual liquid crystal displays.

In the liquid crystal display illustrated in FIG. 3, the polarizing plate of the present invention is disposed on the viewing side of the liquid crystal cell, and the laminated optical film of the present invention is disposed as an optical compensation film between the liquid crystal cell and the viewing-side polarizer. In this embodiment, preferably, the C layer is disposed on the side of the liquid crystal cell, and the B layer is disposed on the side of the polarizer. This embodiment is especially suitable for liquid crystal displays of IPS modes.

In the liquid crystal display illustrated in FIG. 4, the polarizing plate of the present invention is disposed on the back light side of the liquid crystal cell, and the laminated optical film of the present invention is disposed as an optical compensation film between the liquid crystal cell and the back-light-side polarizer. In this embodiment, preferably, the B layer is disposed on the side of the liquid crystal cell, and the C layer is disposed on the side of the polarizer. This embodiment is especially suitable for liquid crystal displays of FFS modes.

In the embodiments of FIGS. 3 and 4, any polarizing plate may be disposed on the opposite side of the liquid crystal cell provided with the polarizing plate of the present invention. In a generally used configuration, two protective films are bonded to the respective surfaces of the polarizer. In the embodiments of FIGS. 3 and 4, the protective film 1 disposed between the liquid crystal cell and the polarizer preferably has low Re and Rth, for example, a Z-TAC film (commercially available from FUJIFILM Corporation). The protective film 2 is not specifically limited and may be the same as the protective film 1.

EXAMPLES

The invention is described in more detail with reference to the following Examples. In the following Examples, the material used, its amount and ratio, the details of the treatment and the treatment process may be suitably modified or changed not overstepping the sprit and the scope of the invention. Accordingly, the invention should not be limitatively interpreted by the Examples mentioned below.

1. Production of Film for B Layer (1) Production of Cellulose Acylate Film for B Layer Cellulose acylate films were produced for B layers in the following manner.

(1)-1 Preparation of Dope

Preparation of Cellulose Acylate Solution

The following components were put into a mixing tank and stirred for dissolution, and the solution was heated at 90° C. for 10 minutes and then filtered by a paper filter having an average pore size of 34 μm and a sintered metallic filter having an average pore size of 10 μm.

Cellulose Acylate Solution of Example 1

| | |
|---|---|
| Cellulose acylate shown in the table total | 100.0 parts by mass |
| High-molecular-weight additive B1 shown below | (amount shown in the table, unit: parts by mass) |
| Low-molecular-weight additive A1 shown below | (amount shown in the table, unit: parts by mass) |
| Sugar additive C1 shown below | (amount shown in the table, unit: parts by mass) |
| Methylene chloride | 403.0 parts by mass |
| Methanol | 60.2 parts by mass |

TABLE 7

| | | High-molecular-weight Additive B1 | | | | | | |
| --- | --- | --- | --- | --- | --- | --- | --- | --- |
| | | Dicarboxylic acid unit | | | | Glycol unit | | |
| Type | Molecular weight | Terephthalic acid (mol %) | Phthalic acid (mol %) | Adipic acid (mol %) | Succinic acid (mol %) | Ethylene glycol (mol %) | 1,2-propanediol (mol %) | PG ratio (%) | Terminus |
| B1 | 800 | 55 | 0 | 0 | 45 | 50 | 50 | 50 | AC | low-molecular-weight Additive A1

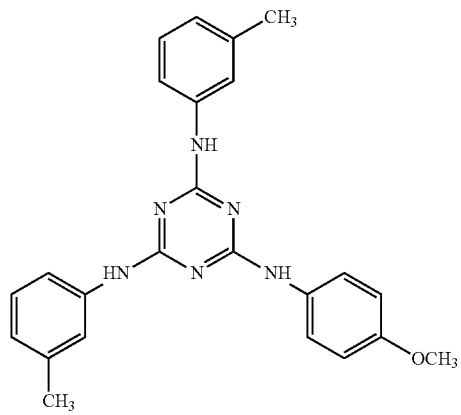

low-molecular-weight Additive A2

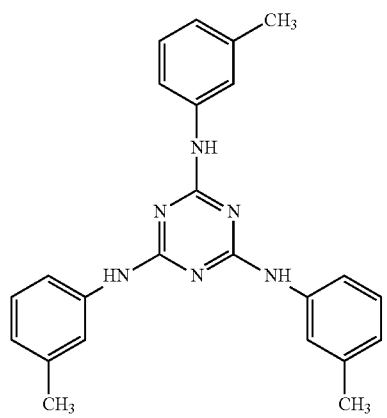

Sugar Additive C1

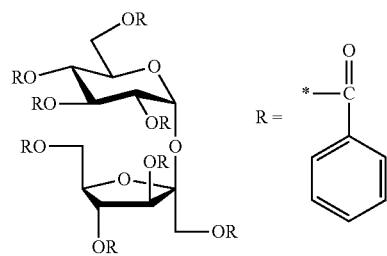

Preparation of Dispersive Matting Agent

The following components including the cellulose acylate solutions prepared as described above were put into a disperser to prepare dispersive matting agents.

Dispersive Matting Agent

| Matting agent (Aerosil R972) | 0.2 parts by mass |
| --- | --- |
| Methylene chloride | 72.4 parts by mass |

-continued

| Methanol | 10.8 parts by mass |
| --- | --- |
| Cellulose acylate solution | 10.3 parts by mass |

Each cellulose acylate solution (100 parts by mass) was mixed with the dispersive matting agent (0.02 parts by mass of inorganic fine particles relative to the cellulose acylate) to prepare a dope for film formation.

(1)-2 Casting

The dope was cast with a band casting machine having a stainless steel band.

(1)-3 Drying

The web (film) produced through the casting process was separated from the band and then transported on pass rolls for drying thereof at a drying temperature of 120° C. for 20 minutes. The term "drying temperature" herein refers to the surface temperature of the film.

(1)-4 Stretching

The web separated from the band was then gripped with a clip, and the gripped film was subjected to fixed-end uniaxial stretching with a tenter at a stretching temperature and a stretching rate shown in the table in the TD orthogonal to the transport direction (MD) of the film.

In the table, the expression "TD value 1/MD-value 2" for a stretching rate means that the film was stretched in the TD at a rate of the value 1 in a tenter zone while being relaxed in the MD at a rate of the value 2.

The stretching rates and temperatures are shown in Table. In Table, a negative value indicates contraction.

(2) Production of Polycarbonate Film as B Layer

Panlite L1225 (commercially available from TEIJIN LIMITED) was dissolved in dichloromethane to prepare a 20 weight % dope, and the dope was subjected to solvent casting into a film which was then dried to prepare a polycarbonate film. The film was cut into a square of 50 mm by 50 mm, and square was stretched with a biaxial stretching apparatus (manufactured by Imoto machinery Co., LTD) at 170° C. and 10 mm/min under conditions shown in Table.

(3) Production of Cyclic Olefin Film for B Layer

ZeonorFilm ZF14 (manufactured by ZEON CORPORATION) was stretched at 140° C. and 30 mm/min under conditions shown in the table.

(4) Process Conditions and Characteristics of Films

Table shows the process conditions and characteristics of the produced cellulose acylate films, polycarbonate film, and cyclic olefin film.

A photoelastic coefficient was determined as follows.

Photoelastic Coefficient

Tensile stress was applied to a film sample of 12 mm by 120 mm in a longitudinal direction, and retardation was measured with an ellipsometer (type M150, manufactured by JASCO Corporation) during the application of tensile stress.

2. Formation of C layer (1) Formation of C layer Primarily Composed of Fumarate Resin (1)-1 Synthesis of Fumarate Resin Hydroxypropyl methylcellulose (product name "METOLOSE 60SH-50" manufactured by Shin-Etsu Chemical Co., Ltd., 48 g), distilled water (15601 g), diisopropyl fumarate (8161 g), (3-ethyloxetane-3-yl)methyl acrylate ester (240 g), and t-butyl peroxypivalate (45 g) as a catalyst were put into a 30 L autoclave with a stirrer, a condenser tube, a nitrogen-introducing tube, and a thermometer, the content was subjected to nitrogen bubbling for an hour and held at 49° C. for 24 hours while being stirred at 200 rpm for radical suspension polymerization. The mixture was cooled to a room temperature to produce a suspension containing polymer particles, and the suspension was subjected to centrifugal separation. The recovered polymer particles were washed twice with distilled water and further washed twice with methanol and then dried at 80° C. under reduced pressure (yield: 80%).

(1)-2 Formation of C layer

The fumarate resin synthesized in the first synthesis process was dissolved in a mixed solvent shown in the following table to prepare a 20% solution, and FLOWLEN AF-1000 (resin manufactured by Kyoeisha Chemical Co., Ltd., SP value: 10.0, Mw: 2000, and acid value: 110 mg-KOH/g) was added as a catalyst shown in the table to the solution in an amount of 1 parts by weight relative to 100 parts by weight of the fumarate resin. The product was then applied onto a surface of any of the films produced as described above and then dried at 80° C. and 130° C. for 4 minutes for each temperature to form the C layer, thereby forming a laminated film.

(2) Formation of C Layer Primarily Composed of Polystyrene

A polystyrene G9504 (commercially available from PS Japan Corporation) was dissolved in a mixed solvent shown in the following table to prepare a 20% solution, and FLOWLEN AF-1000 (resin manufactured by Kyoeisha Chemical Co., Ltd., SP value: 10.0, Mw: 2000, acid value: 110 mg-KOH/g) was added as a catalyst shown in the table to the solution in an amount of 1 parts by weight relative to 100 parts by weight of the polystyrene. The product was then applied

TABLE 8

| Film for B layer No. | Material | Ac/Pr Substitution degree*1 | SP value | Additive Type | Additive Amount | Stretching Temperature ° C. | Stretching Rate % | Characteristics Thickness μm | Re nm | Rth nm | Nz | Photoelasticity (average in MD and TD) × $10^{-12}$ [/Pa] |
|---|---|---|---|---|---|---|---|---|---|---|---|---|
| Film 1 | Cyclic olefin | — | 18.7 | — | — | 150 | TD25 | 60 | 120 | 120 | 1.5 | 2 |
| Film 2 | Cellulose acetate propionate | 1.8/0.6 | 21.7 | C1 | 8 | 170 | TD60 | 50 | 100 | 100 | 1.5 | 14 |
| Film 3 | Cellulose acetate | 2.41/0 | 23.1 | B1 | 12 | 190 | TD60 | 55 | 110 | 105 | 1.5 | 15 |
| Film 4 | Cellulose acetate | 2.79/0 | 22 | B1/A1 | 12/3 | 190 | TD60 | 55 | 80 | 80 | 1.5 | 14 |
| Film 5 | Cellulose acetate | 2.41/0 | 23.1 | B1 | 12 | 190 | TD40/MD-17 | 50 | 120 | 80 | 1.2 | 15 |
| Film 6 | Cellulose acetate propionate | 1.8/0.6 | 21.7 | C1 | 8 | 180 | TD40/MD-17 | 50 | 120 | 65 | 1.0 | 15 |
| Film 7 | Polycarbonate | — | 21.7 | — | — | 170 | Free width 50 | 75 | 125 | 70 | 1.1 | 95 |
| Film 8 | Cellulose acetate | 2.41/0 | 23.1 | B1 | 19 | 190 | TD30 | 60 | 60 | 100 | 2.2 | 16 |
| Film 9 | Cellulose acetate | 2.41/0 | 23.1 | B1 | 12 | 170 | TD60 | 80 | 210 | 220 | 1.5 | 16 |
| Film 10 | Cellulose acetate | 2.41/0 | 23.1 | B1 | 15 | 190 | TD45 | 58 | 75 | 90 | 1.7 | 16 |
| Film 11 | Cellulose acetate | 2.41/0 | 23.1 | B1 | 19 | 190 | TD60 | 55 | 100 | 90 | 1.4 | 16 |
| Film 12 | Cellulose acetate | 2.41/0 | 23.1 | B1 | 19 | 185 | TD40/MD-17 | 50 | 120 | 100 | 1.3 | 16 |
| Film 13 | Cellulose acetate | 2.41/0 | 23.1 | B1 | 19 | 185 | TD60/MD-25 | 50 | 140 | 75 | 1 | 16 |
| Film 14 | Cellulose acetate | 2.41/0 | 23.1 | B1/A2 | 19/5 | 189 | TD70 | 38 | 100 | 100 | 1.5 | 16 |

*1: Degrees of substitution of acetyl group/propionyl group onto a surface of any of the films produced as described above and then dried at 90° C. and 100° C. for 4 minutes for each temperature to form the C layer, thereby forming a laminated film.

(3) Formation of C Layer Primarily Composed of Styrene-Maleic Anhydride Copolymer A styrene-maleic anhydride copolymer "Dylark 332" (commercially available from NOVA Chemicals Corporation) was dissolved in a mixed solvent shown in the following table to prepare a 20% solution, and FLOWLEN AF-1000 (resin manufactured by Kyoeisha Chemical Co., Ltd., SP value: 10.0, Mw: 2000, acid value: 110 mg-KOH/g) was added as a catalyst shown in the table to the solution in an amount of 1 parts by weight relative to 100 parts by weight of the styrene-maleic anhydride copolymer. The product was then applied onto a surface of any of the films produced as described above and then dried at 90° C. and 100° C. for 4 minutes for each temperature to form the C layer, thereby forming a laminated film.

(4) Formation of C Layer Composed of Homeotropic Liquid Crystal (4)-1 Formation of Alignment Film A surface of any one of the B layers produced as described above was saponified, and a commercially available polyimide ("JALS-204R" manufactured by JSR Corporation) was diluted with methyl ethyl ketone into a concentration of 1:1 and then applied onto the saponified surface of the B layer with a wire bar coater at 2.4 ml/m². The resulting product was immediately dried by hot air at 120° C. for 120 seconds to form a vertical alignment film.

(4)-2 Formation of Homeotropic Liquid Crystal Layer

The following rod-like liquid crystal compound (1.8 g), a photopolymerization initiator (Irgacure 907 manufactured by BASF Japan Ltd., 0.06 g), a sensitizer (KAYACURE DETX manufactured by Nippon Kayaku Co., Ltd., 0.02 g), and the following air-interface vertical alignment agent (0.002 g) were dissolved in solvents (9.2 g) having compositions shown in the table, and the solutions were each applied onto the alignment film with a #2 wire bar. The product was attached to a metallic frame and then heated in a thermostatic oven at 100° C. for 2 minutes to align molecules of the rod-like liquid crystal compound. The product was irradiated with ultraviolet (UV) rays for 30 seconds at 100° C. with a 120 W/cm high-pressure mercury lamp to cross-link the rod-like liquid crystal compound. The product was then cooled to room temperature.

Liquid Crystal Compound

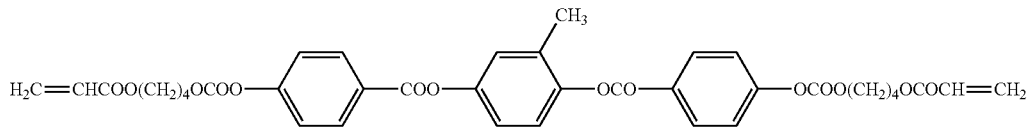

Air-interface Vertical Alignment Agent:
Compound (II-4) Disclosed in JP-A-2003-119959

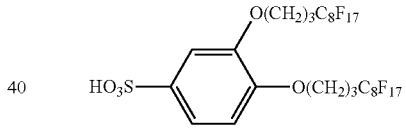

As described above, laminated films each including a C layer composed of homeotropic liquid crystal on a film for a B layer was formed.

(3) Preparative Conditions and Characteristics of Layers

The following table shows the preparative conditions for the layers and the characteristics of the formed layers.

TABLE 9

| C layer No. | Primary component | | Additive | | Solvent | | Characteristics | | |
|---|---|---|---|---|---|---|---|---|---|
| | Material*1 | SP value | Additive*2 | Amount | Type of solvent | Composition mass % | Thickness μm | Re nm | Rth nm |
| Layer 1 | S1 | 19.4 | D1 | 1 | Cyclohexane/Cyclopentanone | 50/50 | 30 | 1 | −55 |
| Layer 2 | S2 | 20.5 | D1 | 1 | MEK/MIBK | 65/35 | 30 | 1 | −60 |
| Layer 3 | L | 22.3 | Same as above | Same as above | MEK/MIBK | 65/35 | 1 | 1 | −105 |
| Layer 4 | L | 22.3 | Same as above | Same as above | MEK/MIBK | 65/35 | 1 | 1 | −105 |
| Layer 5 | L | 22.3 | Same as above | Same as above | MEK/MIBK | 65/35 | 1 | 1 | −105 |
| Layer 6 | L | 22.3 | Same as above | Same as above | MEK/MIBK | 65/35 | 1 | 1 | −105 |
| Layer 7 | F | 19.4 | D1 | 2 | Toluene/MEK | 50/50 | 18 | 2 | −116 |
| Layer 8 | L | 22.3 | Same as above | Same as above | Cyclohexane/Cyclopentanone | 50/50 | 1 | 1 | −105 |
| Layer 9 | L | 22.3 | Same as above | Same as above | MEK/MIBK | 65/35 | 1 | 1 | −105 |
| Layer 10 | L | 22.3 | Same as above | Same as above | MEK/MIBK | 65/35 | 1 | 1 | −105 |

TABLE 9-continued

| C layer | Primary component | | Additive | | Solvent | | Characteristics | | |
|---|---|---|---|---|---|---|---|---|---|
| | | | | | | Composition | Thickness | Re | Rth |
| No. | Material*1 | SP value | Additive*2 | Amount | Type of solvent | mass % | μm | nm | nm |
| Layer 11 | L | 22.3 | Same as above | Same as above | MEK/MIBK | 65/35 | 1 | 1 | −105 |
| Layer 12 | L | 22.3 | Same as above | Same as above | MEK/MIBK | 65/35 | 1 | 1 | −105 |
| Layer 13 | L | 22.3 | Same as above | Same as above | MEK/MIBK | 65/35 | 1 | 1 | −105 |
| Layer 14 | L | 22.3 | Same as above | Same as above | MEK/MIBK | 65/35 | 1 | 1 | −105 |

*1F: Fumarate resin synthesized as described above, S1: Polystyrene G9504, S2: Styrene-maleic anhydride copolymer Dylark 332, L: Polymer of polymerizable rod-like liquid crystal
*2D1: FLOWLEN AF-1000 (manufactured by Kyoeisha Chemical Co., Ltd.)

3. Production of Polarizing Plate (Examples 1 to 10 and Comparative Examples 1 to 4)

Each laminated film produced as described above was attached to one surface of a polarizer composed of polyvinyl alcohol with an adhesive agent, and a FUJITAC T60 film (manufactured by FUJIFILM Corporation) was similarly attached to the other surface of the polarizer to prepare a polarizing plate. The laminated film was attached to the polarizer such that a surface of the B layer was bonded to a surface of the polarizer as illustrated in FIG. 1.

In incorporation of the polarizing plate into a liquid crystal display, the laminated film was disposed between the polarizer and the liquid crystal cell.

Among the laminated films, a laminated film including a polycarbonate film 8 or a cyclic olefin film 1 as the B layer had unsatisfactory adhesion to the polarizer and caused peeling at their peripheral ends after being punched in some cases, as compared to laminated films including cellulose acylate films as the B layer.

The polarizing plates produced as described above were used as viewing-side polarizing plates which will be described later. Back-light-side polarizing plates to be used in combination with the viewing-side polarizing plates were each produced by bonding a Z-TAC film and a FUJITAC TD60 film (each manufactured by FUJIFILM Corporation) onto the front and back surfaces, respectively, of a polarizer. In incorporation of the back-light side polarizing plate into a liquid crystal display, the Z-TAC film was disposed between the polarizer and liquid crystal cell.

4. Production and Evaluation of Liquid Crystal Display
(1) Production of Liquid Crystal Display Each of the above-mentioned polarizing plates including the laminated films was disposed to the viewing side of a liquid crystal cell of an IPS mode (liquid crystal layer had a d·Δn value of 300 nm), and each of the above-mentioned polarizing plates including the Z-TAC films was disposed to the back light side of the liquid crystal cell of an IPS mode to produce a liquid crystal display of an IPS mode having a structure illustrated in FIG. 3.

Example 11

5. Formation of Intermediate Layer (Acrylic Layer)

Two acrylic compounds (100 parts by mass, ACR1: ACR2=33:67) and a photopolymerization initiator (Irgacure 127 manufactured by BASF Japan Ltd., 4 parts by mass) were dissolved in a solvent [methyl acetate/methyl isobutyl ketone (MIBK)=70/30 mass %] to prepare a composition for an acrylic layer containing 20 mass % solid components.

The composition for an acrylic layer was applied onto the film 14 with a #1.6 wire bar coater and then dried at 60° C. for a half minute. The product was then irradiated with UV rays at an intensity of 40 mW/cm² and a dose of 120 mJ/cm² with a high-pressure mercury lamp under a nitrogen purge at 30° C. and an oxygen concentration of approximately 0.1% for 30 seconds to cure the intermediate layer. The intermediate layer had a thickness of 0.6 μm. The film formed by coating the film 14 with the acrylic layer in this manner was used as film 14-2.

The compounds used were as follows.

ACR1: BLEMMER GLM (manufactured by NOF CORPORATION) being a compound having the following structure:

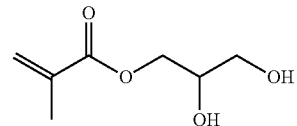

ACR2: KAYARAD PET30 (manufactured by Nippon Kayaku Co., Ltd.) being a compound having the following structure:

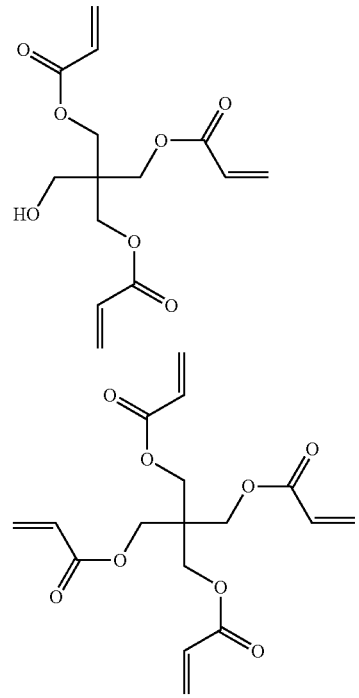

6. Formation of Retardation Layer 15

A liquid crystal composition (mixing ratio of B01:B02=90:10, 1.8 g), a photopolymerization initiator (Irgacure 907 manufactured by BASF Japan Ltd., 0.06 g), a sensitizer (KAYACURE DETX manufactured by Nippon Kayaku Co., Ltd., 0.02 g), a vertical alignment agent (0.002 g), and an acrylic compound (ACR3, 0.14 g) were dissolved in a solvent (MEK/cyclohexanone=90/10 mass %), and the solution was applied onto the intermediate layer with a #3.2 wire bar. The product was attached to a metallic frame and then heated in a thermostatic oven at 100° C. for 2 minutes to align molecules of the rod-like liquid crystal compound. The heated product was then cooled to 50° C. and subsequently irradiated with UV rays at an intensity of 190 mW/cm² and a dose of 300 mJ/cm² with an air-cooled metal halide lamp (manufactured by EYE GRAPHICS CO., LTD.) under a nitrogen purge at an oxygen concentration of approximately 0.1% to cure the coated layer. The coated layer was then cooled to room temperature.

The laminated retardation film was formed in this manner so as to include a retardation layer 15 being a homeotropic liquid crystal layer formed on the intermediate layer. This retardation film was used as film 14-3.

The compounds used were as follows.

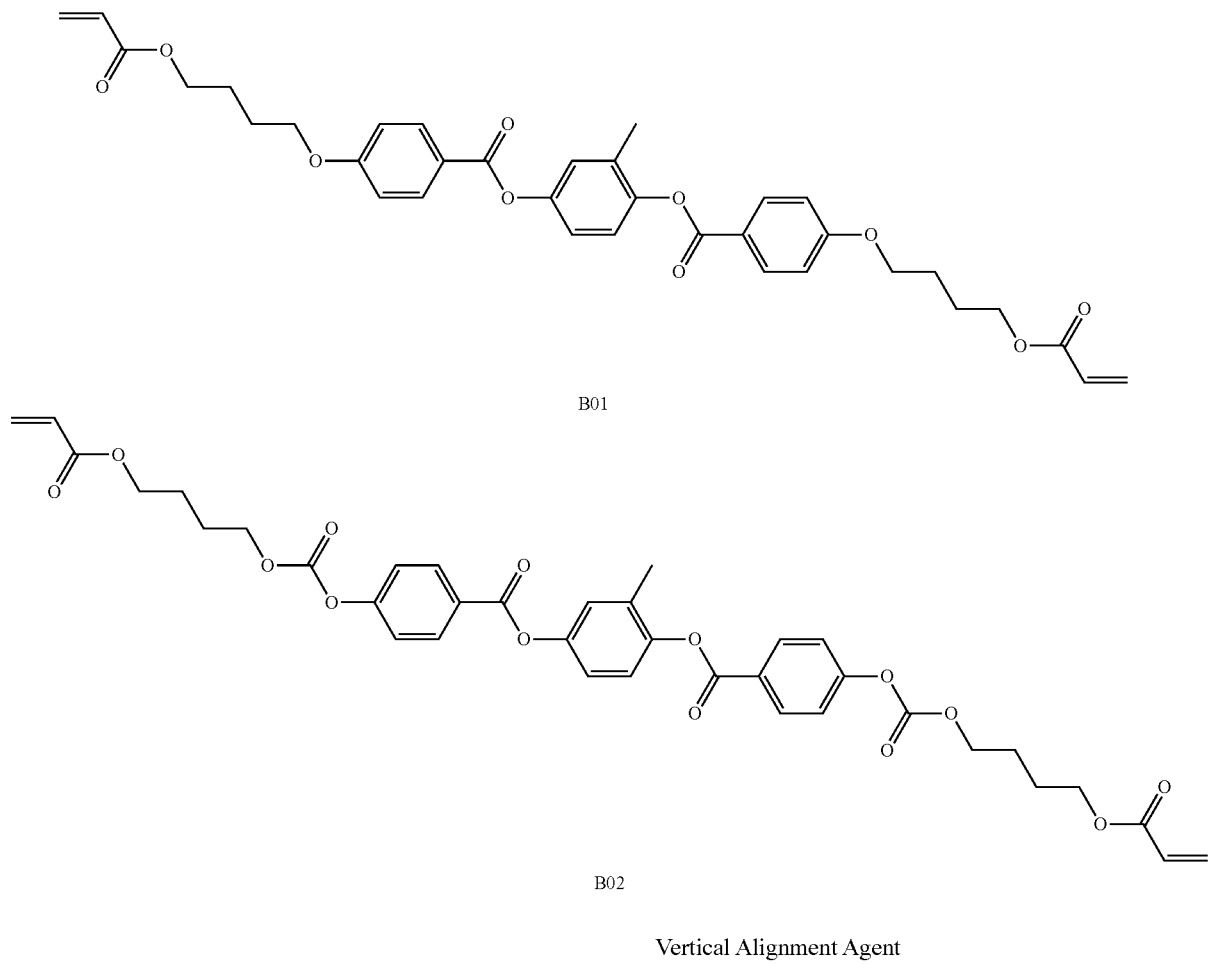

B01

B02

Vertical Alignment Agent

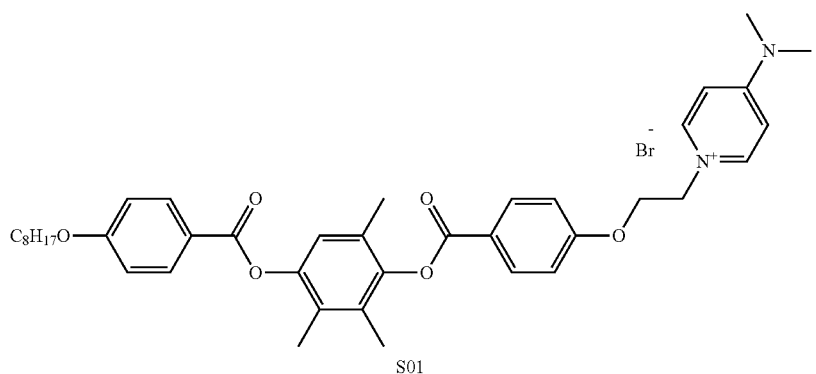

S01

Acrylic Compound ACR3

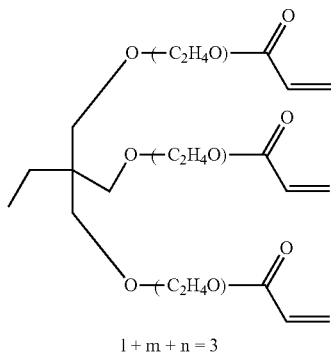

$l + m + n = 3$

7. Production of Polarizing Plate (Example 11)

Film 14-3 was attached to one surface of a polarizer composed of polyvinyl alcohol with an adhesive agent. Similarly, a FUJITAC T40 film (manufactured by FUJIFILM Corporation) was attached to the other surface of the polarizer to prepare a polarizing plate. Film 14-3 was attached to the polarizer such that a surface of the cellulose acylate film being a support was bonded to a surface of the polarizer.

In incorporation of the polarizing plate into a liquid crystal display, the retardation film was disposed between the polarizer and the liquid crystal cell. This polarizing plate was used as polarizing plate 14.

The polarizing plate produced as described above was used as a viewing-side polarizing plate which will be described later. Back-light-side polarizing plate to be used in combination with the viewing-side polarizing plate was produced by bonding a Z-TAC film and a FUJITAC T40 film (each manufactured by FUJIFILM Corporation) onto the front and back surfaces, respectively, of a polarizer. In incorporation of the back-light side polarizing plate into a liquid crystal display, the Z-TAC film was disposed between the polarizer and liquid crystal cell.

Preparation of Polarizing Plate with Adhesive Layer Formation of Adhesive Layer

A composition for an adhesive layer provided between the polarizing plate 14 and the liquid crystal cell was used as a coating liquid and applied onto a separate film with a die coater, the separate film having been subjected to surface treatment with a release agent composed of silicone. The product was dried at 90° C. for 5 minutes to form an acrylate adhesive layer. The adhesive layer had a thickness of 15 μm.

Transfer and Aging of Adhesive Layer

The adhesive layer was transferred onto one surface of the polarizing plate 14, and the product was left for stand for 7 days at 23° C. and 65% relative humidity to produce a polarizing plate with the adhesive layer. This polarizing plate was used as a polarizing plate 14N.

8. Production of Liquid Crystal Display

Preparation of Liquid Crystal Cell

A liquid crystal panel was removed from a "The new iPad" (manufactured by Apple Inc.) including an IPS-mode liquid crystal cell, only the front-side (upper side) optical film of two optical films with a liquid crystal cell interposed therebetween was removed, and then a surface of the front glass of the liquid crystal cell was cleaned.

The polarizing plate 14N was attached to the viewing-side surface of the IPS-mode liquid crystal cell such that the adhesive surface of the polarizing plate 14N faced the glass.

An IPS-mode liquid crystal display was produced in this manner.

9. Evaluation of Liquid Crystal Display

Evaluation of Front Contrast (Front CR)

A back light was mounted to the liquid crystal display of an IPS mode, and the brightness of the liquid crystal display lightning in a black display mode and a white display mode was measured with a Fourier optics viewing angle instrument ("EZ-Contrast XL88" manufactured by ELDIM) to determine the front CR. The results of measurement were evaluated on the basis of the following criteria:

A: $1400 \leq CR$;

B: $1300 \leq CR < 1400$;

C: $1200 \leq CR < 1300$; and

D: $CR \leq 1200$.

Evaluation of Uneven Brightness

A back light was attached to each of the liquid crystal displays of IPS modes, and their surface profiles were visually observed. The results were evaluated on the basis of the following criteria.

A: Invisible;

B: Slightly visible;

C: Visible, but acceptable; and

D: Obviously visible, and impractical.

Evaluation of Color Shift (Diagonal Tint)

A back light was attached to each of the liquid crystal displays of IPS modes, and the liquid crystal displays lightning in a black display mode were observed in a direction at a polar angle of 60° with respect to the front side with a Fourier optics viewing angle instrument ("EZ-Contrast XL88" manufactured by ELDIM). The term "color shift" was defined as an index of the average of the maximum ΔE values at azimuthal angles of 0 to 90° (first quadrant), 90 to 180° (second quadrant), 180 to 270° (third quadrant), and 270 to 360° (fourth quadrant), and the color shift was evaluated on the basis of the following criteria:

A: Substantially not observed;

B: Observed, but practical; and

C: Observed, and impractical.

Evaluation of Viewing Angle CR (Diagonal CR)

A back light was attached to each of the IPS-mode liquid crystal displays, and the brightness of the liquid crystal displays lightning in a black display mode and a white display mode was measured in a dark room with a Fourier optics viewing angle instrument ("EZ-Contrast XL88" manufactured by ELDIM). The term "viewing angle contrast ratio (viewing angle CR)" was defined as the average of the minimum values of the measured brightness in quadrants in a direction at a polar angle of 60°. The viewing angle CR was evaluated on the basis of the following criteria:

A: A viewing angle CR of not less than 100, practical;

B: A viewing angle CR of not less than 70 and less than 100, substantially practical;

C: A viewing angle CR of not less than 50 and less than 70, slightly impractical; and D: A viewing angle CR of less than 50, impractical.

Evaluation of Adhesion between B and C Layers

The adhesion between the B and C layers was observed for each polarizing plate through the following steps, and the results were evaluated on the basis of the following criteria:
(1) The polarizing plates were cut with a cutter knife to form 100 cross-cut squares of 2 mm by 2 mm;
(2) An adhesive cellophane tape, CELLOTAPE (registered trademark, manufactured by Nichiban Co., Ltd., series No. 405, and width of 24 mm) was attached onto cut lines and then squashed to remove air;
(3) The CELLOTAPE was pinched at its end and then quickly separated in a direction at 90°; and
(4) Steps (2) and (3) were repeated four times for the same cut lines, and the number of remaining squares was counted to evaluate adhesion on the basis of the following criteria:
A: 100 squares remaining;
B: 96 to 99 squares remaining;
C: 80 to 95 squares remaining; and
D: not more than 79 squares remaining.

The results are shown below together with the characteristics of the B and C layers. In the table, the term "CAP" indicates cellulose acetate propionate, and the term "PC" indicates polycarbonate.

TABLE 10

| Examples and comparative examples | B layer | | | | | | | | | C layer | |
|---|---|---|---|---|---|---|---|---|---|---|---|
| | Primary component | | | | Characteristics | | | | | | Characteristics |
| | Film No. | Material | Ac/Pr substitution degree | SP value | Thickness µm | Re nm | Rth nm | Nz | Photoelasticity × $10^{-12}$ [/Pa] | Layer No. | Re/Rth nm |
| Example 1 | Film 1 | Cyclic olefin | — | 18.7 | 60 | 120 | 120 | 1.5 | 2 | Layer 1 | 1/−55 |
| Example 2 | Film 2 | CAP | 1.8/0.6 | 21.7 | 50 | 100 | 100 | 1.5 | 14 | Layer 2 | 1/−60 |
| Example 3 | Film 3 | Cellulose acetate | 2.41/0 | 23.1 | 55 | 110 | 105 | 1.5 | 15 | Layer 3 | 1/−105 |
| Example 4 | Film 4 | Cellulose acetate | 2.79/0 | 22 | 55 | 80 | 80 | 1.5 | 14 | Layer 4 | 1/−105 |
| Example 5 | Film 5 | Cellulose acetate | 2.41/0 | 23.1 | 50 | 120 | 80 | 1.2 | 15 | Layer 5 | 1/−105 |
| Example 6 | Film 6 | CAP | 1.8/0.6 | 21.7 | 50 | 120 | 65 | 1 | 15 | Layer 6 | 1/−105 |
| Comparative Example 1 | Film 7 | PC | — | 21.7 | 75 | 125 | 70 | 1.1 | 95 | Layer 7 | 2/−116 |
| Comparative Example 2 | Film 1 | Cyclic olefin | 2.41 | 18.7 | 60 | 120 | 120 | 1.5 | 2 | Layer 8 | 1/−105 |
| Comparative Example 3 | Film 8 | Cellulose acetate | 2.41/0 | 23.1 | 60 | 60 | 100 | 2.2 | 16 | Layer 9 | 1/−105 |
| Comparative Example 4 | Film 9 | Cellulose acetate | 2.41/0 | 23.1 | 80 | 210 | 220 | 1.5 | 16 | Layer 10 | 1/−105 |
| Example 7 | Film 10 | Cellulose acetate | 2.41/0 | 23.1 | 58 | 75 | 90 | 1.7 | 16 | Layer 11 | 1/−105 |
| Example 8 | Film 11 | Cellulose acetate | 2.41/0 | 23.1 | 55 | 100 | 90 | 1.4 | 16 | Layer 12 | 1/−105 |
| Example 9 | Film 12 | Cellulose acetate | 2.41/0 | 23.1 | 50 | 120 | 100 | 1.3 | 16 | Layer 13 | 1/−105 |
| Example 10 | Film 13 | Cellulose acetate | 2.41/0 | 23.1 | 50 | 140 | 75 | 1 | 16 | Layer 14 | 1/−105 |
| Example 11 | Film 14 | Cellulose acetate | 2.41/0 | 23.1 | 38 | 100 | 100 | 1.5 | 16 | Layer 15 | 0/−155 |

| Examples and comparative examples | C layer | | | | Evaluation | | | | Adhesion between B and C layers |
|---|---|---|---|---|---|---|---|---|---|
| | Primary component | | | Laminated film | | | | | |
| | Material | SP value | ΔSP value | Thickness µm | Front CR | Brightness Unevenness | Diagonal tint | Diagonal CR | |
| Example 1 | S1 | 19.4 | 0.7 | 90 | C | B | C | C | A |
| Example 2 | S2 | 20.5 | 1.2 | 80 | C | B | C | C | B |
| Example 3 | L | 22.3 | 0.8 | 56 | A | B | A | A | A |
| Example 4 | L | 22.3 | 0.3 | 56 | B | B | B | B | A |
| Example 5 | L | 22.3 | 0.8 | 51 | A | B | A | A | A |
| Example 6 | L | 22.3 | 0.7 | 51 | A | B | A | A | A |
| Comparative Example 1 | F | 19.4 | 2.4 | 93 | C | D | B | B | C |
| Comparative Example 2 | L | 22.3 | 3.6 | 61 | B | B | B | B | D |
| Comparative Example 3 | L | 22.3 | 0.8 | 61 | C | B | D | C | A |
| Comparative Example 4 | L | 22.3 | 0.8 | 81 | C | B | D | C | A |

TABLE 10-continued

| | | | | | | | | | |
|---|---|---|---|---|---|---|---|---|---|
| Example 7 | L | 22.3 | 0.8 | 59 | B | B | B | B | A |
| Example 8 | L | 22.3 | 0.8 | 56 | A | B | A | A | A |
| Example 9 | L | 22.3 | 0.8 | 51 | A | B | A | A | A |
| Example 10 | L | 22.3 | 0.8 | 51 | A | B | A | A | A |
| Example 11 | L | 22.3 | 0.8 | 40 | A | A | A | A | A |

The results shown in the table demonstrate that use of the laminated films including the B and C layers for liquid crystal displays of horizontal-alignment modes can improve diagonal viewing-angle characteristics without a decrease in a front contrast ratio and uneven brightness, the B and C layers satisfying the formulae (Ib) to (IIIb) and the formulae (Ic) and (IIc), respectively, and the laminated film exhibiting a |ΔSP value| of 1.5 or lower as the absolute value of a difference in SP value between the primary components of the B and C layers. In addition, adhesion between the B and C layers can be enhanced.

The present disclosure relates to the subject matter contained in Japanese Patent Application No. 216236/2011 filed on Sep. 30, 2011, and Japanese Patent Application No. 205360/2012, filed on Sep. 19, 2012, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A laminated optical film comprising:
a B layer; and
a C layer, wherein
the B layer satisfies the following three formulae (Ib) to (IIIb):

$1.0 \leq Nz \leq 3.0;$ (Ib)

$70 \text{ nm} \leq Re(550);$ and (IIb)

$0 \text{ nm} \leq Rth(550) \leq 200 \text{ nm},$ (IIIb)

the C layer satisfies the following two formulae (Ic) and (IIc):

$Re(550) \leq 10 \text{ nm};$ and (Ic)

$-200 \text{ nm} \leq Rth(550) \leq -50 \text{ nm},$ and absolute value |ΔSP value | of a difference in SP value between primary components of the B and C layers is not more than 1.5, where: (IIc)

Re(550) and Rth(550) are retardation (nm) in plane and retardation (nm) along the thickness direction, respectively, at a wavelength of 550 nm, Nz = (nx-nz)/(nx-ny), wherein nx represents a refractive index in the in-plane slow axis direction; ny represents a refractive index in the in-plane direction perpendicular to nx; and nz represents a refractive index in the direction perpendicular to nx and ny, the SP value refers to the value of the solubility parameter determined by Hoy's method, and the primary component indicates a component of the highest content.

2. The laminated optical film according to claim 1, wherein the primary component of the B layer is cellulose acetate having a degree of substitution of 2.0 to 2.8.

3. The laminated optical film according to claim 1, wherein the primary component of the B layer is cellulose acetate having a degree of substitution of 2.2 to 2.5.

4. The laminated optical film according to claim 1, wherein the B layer has a photoelastic coefficient of not more than $40 \times 10^{-12}$ [/Pa].

5. The laminated optical film according to claim 1, wherein the C layer comprises an organic polymer as the primary component.

6. The laminated optical film according to claim 1, wherein the primary component of the C layer is rod-like liquid crystal, and molecules of the rod-like liquid crystal are fixed in a homeotropic alignment.

7. The laminated optical film according to claim 1, wherein the B and C layers adjoin each other.

8. The laminated optical film according to claim 1, wherein at least one of the B and C layers is formed by coating.

9. The laminated optical film according to claim 1, wherein the laminated optical film has a total thickness of 80 μm or lower.

10. The laminated optical film according to claim 1, wherein the primary component of the B layer is cellulose acetate having a degree of substitution of 2.2 to 2.5, and the B layer has a photoelastic coefficient of not more than $40 \times 10^{-13}$ m$^2$/N.

11. The laminated optical film according to claim 1, wherein the primary component of the B layer is cellulose acetate having a degree of substitution of 2.0 to 2.8, and the C layer comprises an organic polymer as a primary component.

12. The laminated optical film according to claim 1, wherein the primary component of the B layer is cellulose acetate having a degree of substitution of 2.0 to 2.8, and the primary component of the C layer is rod-like liquid crystal, and molecules of the rod-like liquid crystal are fixed in a homeotropic alignment.

13. The laminated optical film according to claim 1, wherein the B layer has a photoelastic coefficient of not more than $40 \times 10^{-13}$ m$^2$/N, and the C layer comprises an organic polymer as a primary component.

14. The laminated optical film according to claim 1, wherein the B layer has a photoelastic coefficient of not more than $40 \times 10^{-13}$ m$^2$/N, and the primary component of the C layer is rod-like liquid crystal, and molecules of the rod-like liquid crystal are fixed in a homeotropic alignment.

15. The laminated optical film according to claim 1, wherein the primary component of the B layer is cellulose acetate having a degree of substitution of 2.2 to 2.5, and the C layer comprises an organic polymer as the primary component.

16. The laminated optical film according to claim 1, wherein the primary component of the B layer is cellulose acetate having a degree of substitution of 2.2 to 2.5, and the primary component of the C layer is rod-like liquid crystal, and molecules of the rod-like liquid crystal are fixed in a homeotropic alignment.

17. The laminated optical film according to claim 1, wherein the primary component of the B layer is cellulose acetate having a degree of substitution of 2.2 to 2.5, the B layer has a photoelastic coefficient of not more than $40 \times 10^{-13}$ $m^2/N$, the C layer comprises an organic polymer as the primary component, and wherein the B and C layers adjoin each other.

18. The laminated optical film according to claim 1, wherein the primary component of the B layer is cellulose acetate having a degree of substitution of 2.2 to 2.5, the B layer has a photoelastic coefficient of not more than $40 \times 10^{-13}$ $m^2/N$, the primary component of the C layer is rod-like liquid crystal, and molecules of the rod-like liquid crystal are fixed in a homeotropic alignment, and the B and C layers adjoin each other.

19. A polarizing plate comprising: a polarizer; and the laminated optical film according to claim 1.

20. A liquid crystal display of a horizontal-alignment mode, the liquid crystal display comprising: the laminated optical film according to claim 1.

* * * * *